March 26, 1968 W. D. JOHNSON ET AL 3,374,707
VARIABLE WIDTH SCANNING FILM VIEWER
Filed Sept. 2, 1965 16 Sheets-Sheet 1

INVENTORS
William D. Johnson
Vincent Grippi, Jr.
BY Edward C. Aguilar
Warren, Brosler, Cypher, and Anglin
Their Attorneys INVENTORS
William D. Johnson
Vincent Grippi, Jr.
Edward G. Aguilar
BY Warren Bresler, Gopher and Anglim
Their Attorneys March 26, 1968 W. D. JOHNSON ET AL 3,374,707
VARIABLE WIDTH SCANNING FILM VIEWER
Filed Sept. 2, 1965 16 Sheets-Sheet 3

INVENTORS
William D. Johnson
Vincent Grippi, Jr.
Edward C. Aguilar
BY

Attorneys

INVENTORS
William D. Johnson
Vincent Grippi, Jr.
Edward C. Aguilar

Their Attorneys

Fig. 9
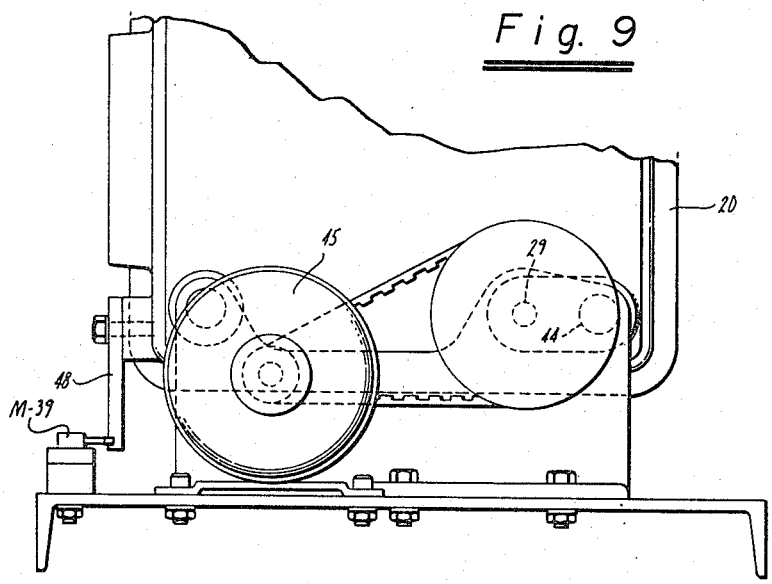
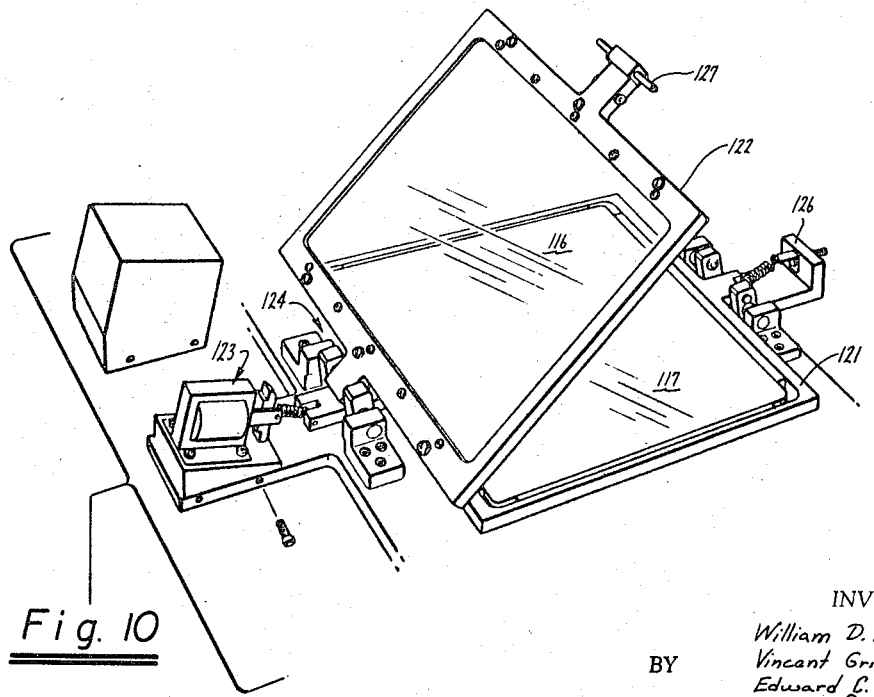
Fig. 10
INVENTORS
William D. Johnson
Vincent Grippi, Jr.
Edward C. Aguilar
BY Warren, Boosler, Guhe and Anglin
Their Attorneys March 26, 1968   W. D. JOHNSON ET AL   3,374,707
VARIABLE WIDTH SCANNING FILM VIEWER
Filed Sept. 2, 1965   16 Sheets-Sheet 9

INVENTORS
William D. Johnson
Vincent Grippi, Jr.
BY   Edward C. Aguilar
Warren, Bresler, Gjoheand Anglim
Their Attorneys March 26, 1968 W. D. JOHNSON ET AL 3,374,707
VARIABLE WIDTH SCANNING FILM VIEWER
Filed Sept. 2, 1965 16 Sheets-Sheet 10
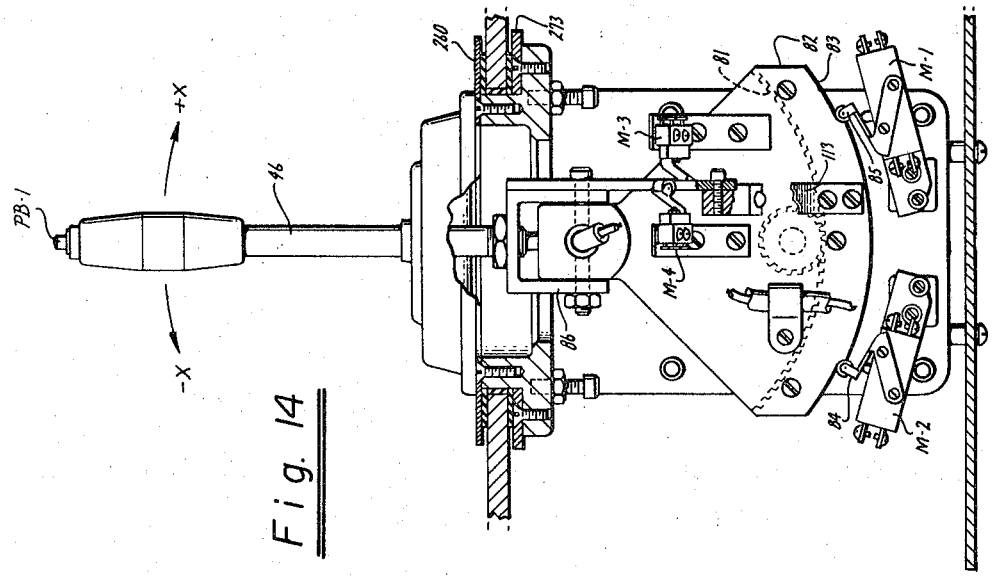
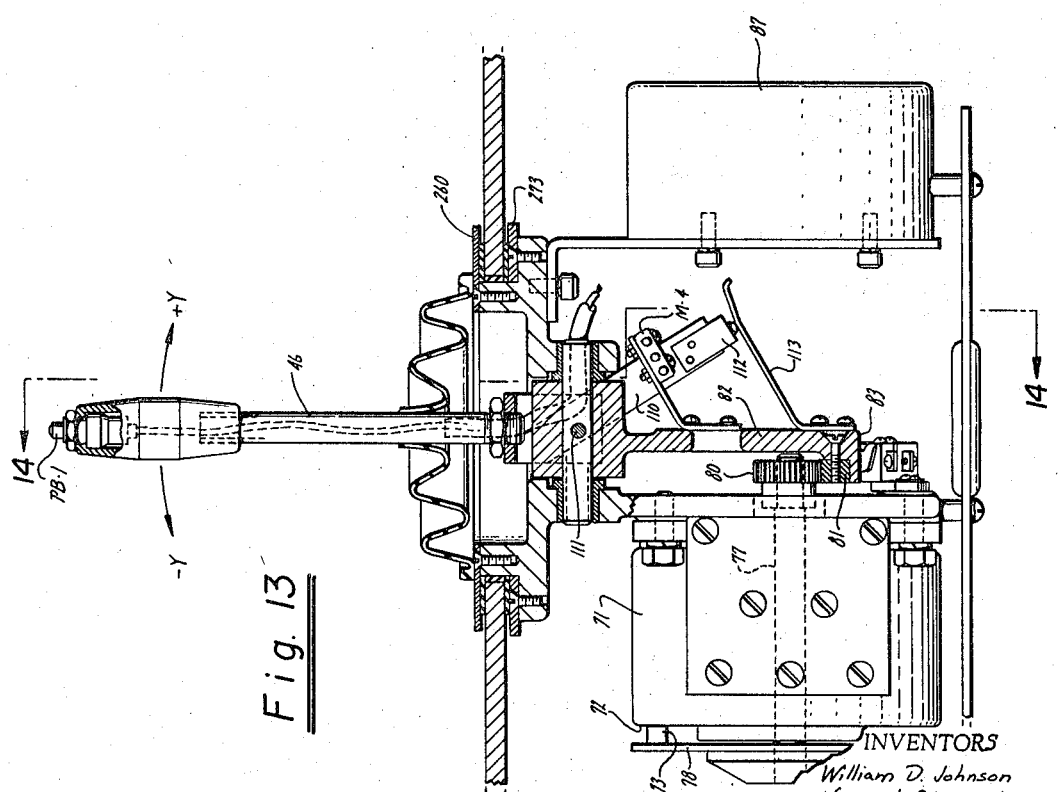
INVENTORS
William D. Johnson
Vincent Grippi, Jr.
Edward C. Aguilar
BY
Attorneys INVENTORS
William D. Johnson
Vincent Grippi, Jr.
Edward C. Aguilar
BY
Warren, Bresler, Gyphe and Anglin
Their Attorneys INVENTORS
William D. Johnson
Vincent Grippi, Jr.
Edward C. Aguilar
BY Warren, Brosler, Cypher and Anglim
Their Attorneys March 26, 1968   W. D. JOHNSON ET AL   3,374,707
VARIABLE WIDTH SCANNING FILM VIEWER
Filed Sept. 2, 1965   16 Sheets-Sheet 14

INVENTORS
William D. Johnson
Vincent Grippi, Jr.
Edward C. Aquilar
BY Warren, Brooler, Cypher and Anglim
Their Attorneys

Fig. 20

INVENTORS
William D. Johnson
Vincent Grippi, Jr.
Edward C. Aquilar
Warren, Brosler, Cypher and Anglim
Their Attorneys

United States Patent Office 3,374,707
Patented Mar. 26, 1968

3,374,707
VARIABLE WIDTH SCANNING FILM VIEWER
William D. Johnson, Santa Clara, Vincent Grippi, Jr., Novato, and Edward C. Aguilar, Berkeley, Calif., assignors to Houston Fearless Corporation, doing business as Nuclear Research Instruments, a division of Houston Fearless Corporation, a corporation of California
Filed Sept. 2, 1965, Ser. No. 484,579
8 Claims. (Cl. 88—28)

ABSTRACT OF THE DISCLOSURE

An apparatus for viewing continuous-reel film transparencies at different magnifications and at varying film speeds consisting of a viewing screen; a light source; reel means for positioning the film in the optical path between the light source and screen; means for driving the reel means rotationally and laterally; a plurality of projection lenses movable into the optical path; a plurality of condensing lenses movable into the path of the light from the light source in varying combinations; and power and control means for moving the projection lenses, the condensing lenses, the light source and the reel means.

---

The invention relates to film viewers and in particular to viewers adaptable for use in photo interpretation.

An object of the present invention is to provide a new and improved variable width scanning film viewer.

Another object is to provide a viewer of the character described which will permit viewing of the film at different magnifications without a substantial change in the level of screen illumination.

A further object is to provide a viewer as described which is adaptable for showing the film emulsion side up or down.

Still another object is to provide a viewer as described which can be constructed relatively inexpensively from a minimum of reliable components for moving a reel of film in either direction at infinitely varying speed ranges; changing speeds smoothly and at infinitely varying accelerations responsive to operator control.

A still further object of the present invention is to provide a device which can rotate the film, move it laterally for magnified viewing of all parts of the film and clamp the film for fine focusing.

Another object is to provide a viewer in which the film can be quickly and easily loaded and unloaded.

A further object is to provide a viewer of the character described for moving the film from a position at rest to a pre-selected initial speed which is slower than previously possible in film viewing mechanisms and without noticeable uneven starting of the film.

Still another object of the present invention is to provide a device having infinitely variable scan and slew modes of film travel.

Another object of the invention as above described is to provide a film viewer adaptable for receiving and accommodating film of variable widths and thickness.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to the drawings (15 sheets) FIGURE 1 is a side elevation view of the variable width scanning film viewer constructed in accordance with the present invention with portions broken away and some parts removed for purposes of clarity.

FIGURE 9 is a front elevation view of a portion of the device shown on an enlarged scale and taken substantially along the line 9—9 of FIGURE 2.

FIGURE 10 is a perspective view of a portion of the device with some parts in an "exploded" position for purposes of clarity.

FIGURE 13 is a side elevation view of a portion of the device shown on an enlarged scale and taken substantially along the line 13—13 of FIGURE 1.

FIGURE 14 is a side elevation view taken substantially along the line 14—14 in FIGURE 13.

FIGURE 20 is a functional wiring diagram of the stage rotation mechanism constructed in accordance with the present invention.

Figure 1:
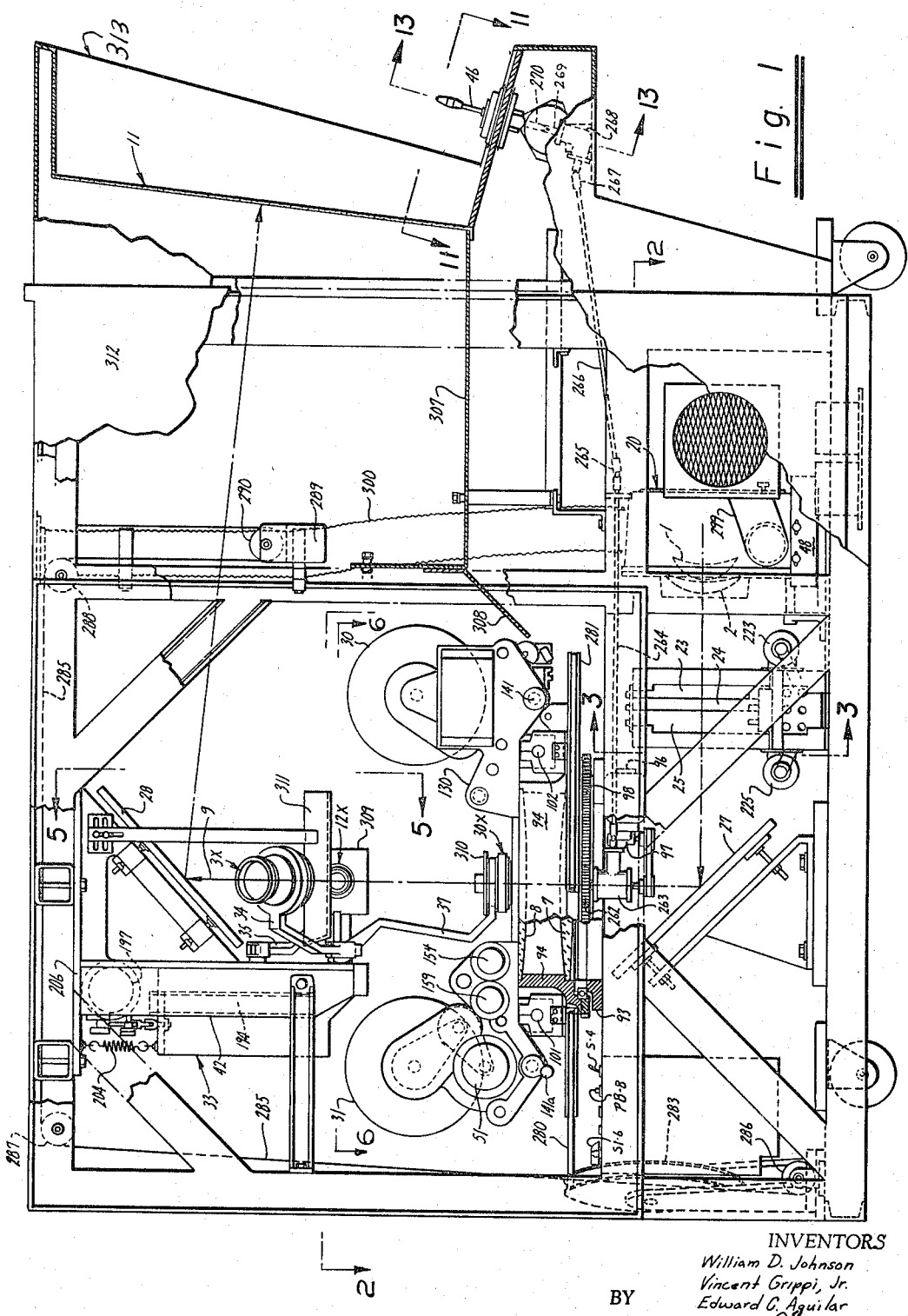
Figure 2:
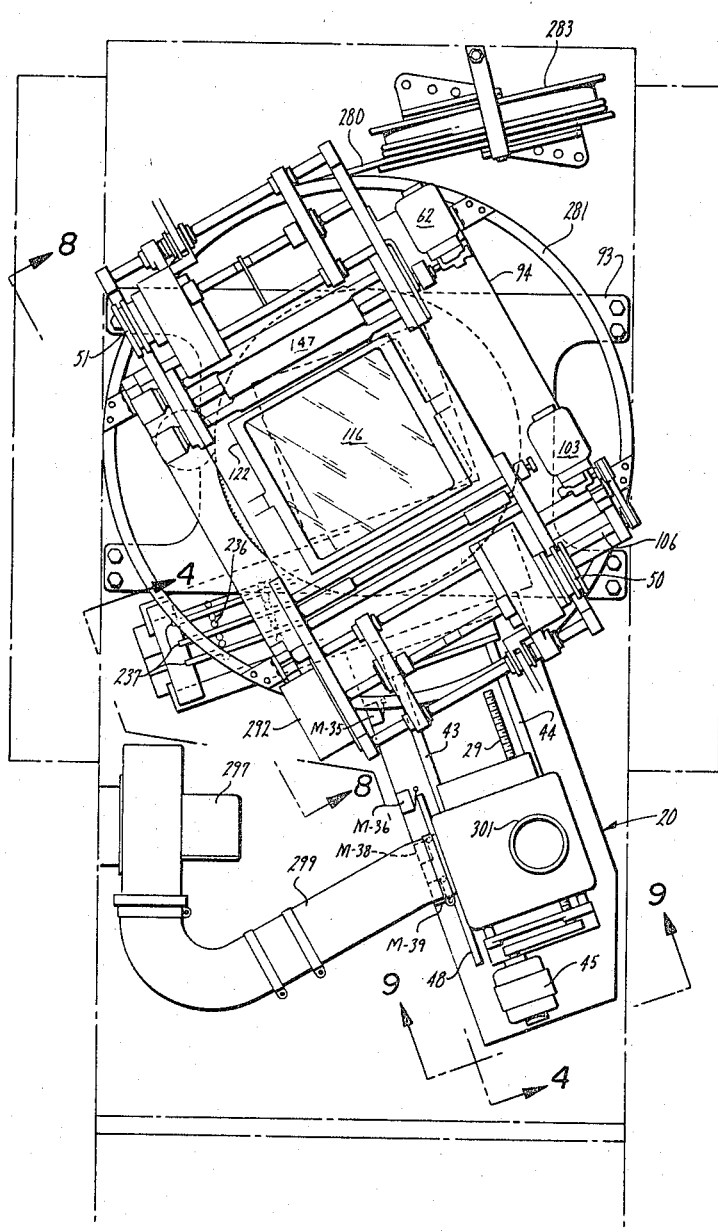
FIGURE 2 is a top plan view of the device shown in FIGURE 1 on a reduced scale with parts removed for purposes of clarity and some moving parts shifted and rotated for purposes of understanding.
Figure 3:
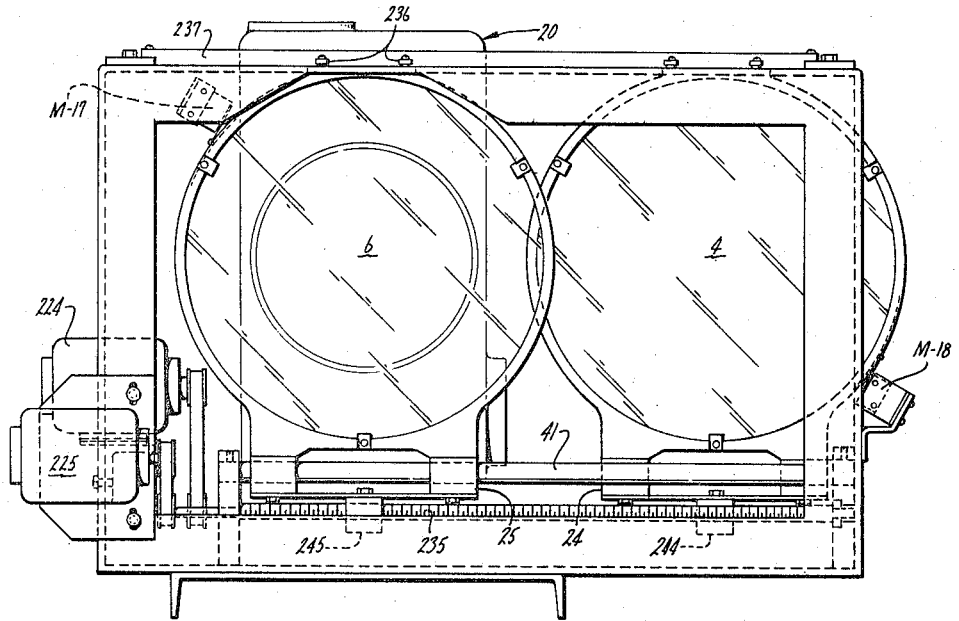
FIGURE 3 is a front elevation view of a portion of the device on an enlarged scale taken substantially along the line 3—3 of FIGURE 1.
Figure 4:
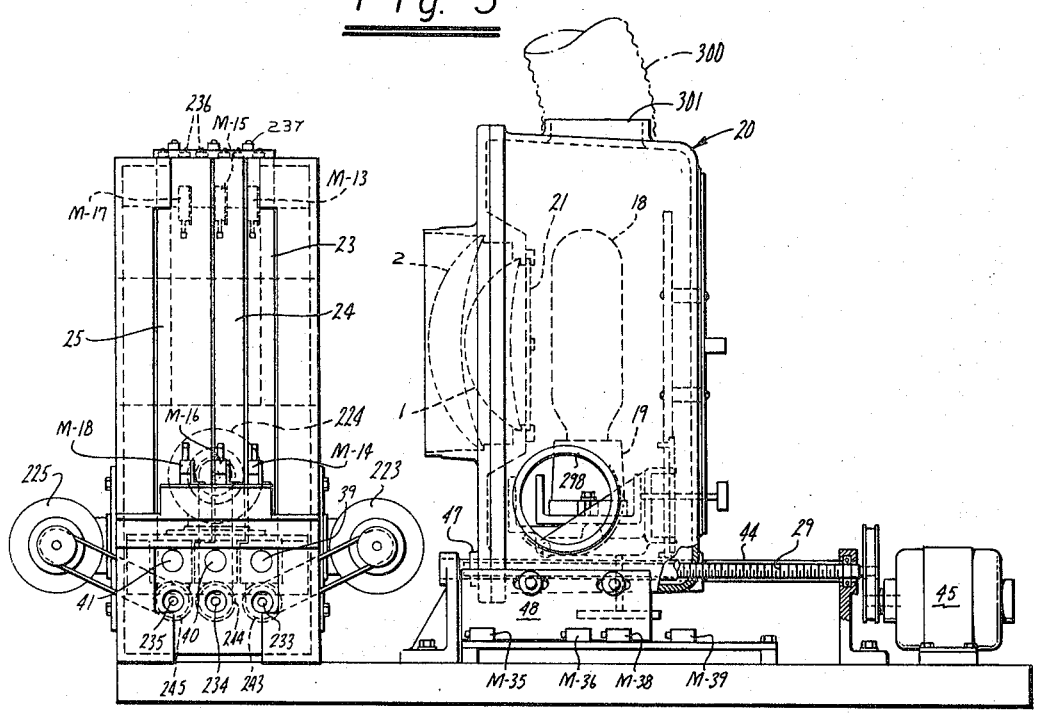
FIGURE 4 is a side elevation view of the device shown on an enlarged scale and taken substantially along the line 4—4 of FIGURE 2.

The present invention consists briefly of a rear view translucent image viewing screen 11; a light source; first means for positioning a film transparency in the optical path (designated by arrow 9) between the light source and the screen; a plurality of projection lenses, here shown as lenses 3×, 6×, 12× and 30×; second means selectively positioning said lenses at predetermined positions in the optical path between the film and screen; a condenser lens mounted adjacent the film plane and in the optical path between the light source and the film plane, here consisting of condensing lenses 7 and 8; a plurality of auxiliary condensing lenses, here consisting of condensing lenses 3, 4, 5 and 6; third means selectively positioning the auxiliary lenses at predetermined positions in the optical path between the condenser lens and the light source; and fourth means mounting the light source for movement on the optical path to predetermined positions to and from the film plane; and manually operated means for selectively energizing the second, third and fourth means for producing a plurality of magnifications of the film transparencies on the screen with substantially uniform illumination over the image on the screen for each of the magnifications.

The light source here consists of a tungsten filament projection lamp 18 mounted on a base 19 and enclosed by a housing 20 having a front opening for receiving a Pyrex heat glass 21 and a 5 inch diameter fused quartz condensing lens 1 and a 7 inch diameter fused quartz condensing lens 2; both being concave-convex.

Auxiliary condensing lenses 3, 4, 5 and 6 are 12 inch diameter crown glass. Lens 3 is of plano-convex configuration and is here mounted in one holder 23. Lens 4 is of bi-convex configuration and is here mounted in holder 24. Lenses 5 and 6 are mounted in a single holder 25; lens 5 being convex-concave and lens 6 bi-convex. Lenses 7 and 8 are here made of crown glass and having a 15¼ inch diameter; lens 7 being bi-convex and lens 8 plano-convex.

A mirror 27 reflects the image of the projection lamp through condensing lenses 7 and 8; through the film and projection lenses to a second mirror 28 which reflects the film image upon the screen 11.

Projection lens 3× is 360 mm. F/5.6 and having a field of view 10″ x 10″. Projection lens 6× is a 240 mm. F/5.6 and having a field of view of 5″ x 5″. Projection lens 12× is a 135 mm. F/3.5 and having a field of view of 2.5″ x 2.5″. Projection lens 30× is a 60 mm. F/2.0 having a field of view of 1″ x 1″.

The viewing screen 11 is here a water-white on one-quarter inch thick glass and having a size of 30″ x 30″. The illuminance at the screen is 30 foot-candles minimum on the operator's side of the screen on axis with an open film gate at any magnification.

The first means above referred to for positioning the film in the optical path consists of a supply reel 30 and a take-up reel 31 for receiving a length of film.

The second means above referred to consists briefly of a turret frame 33 upon which the projection lenses are pivotally mounted; lens 3× being mounted on arm 34, lens 6× on arm 35 and lens 12× on one end of a V-shaped arm 36 with lens 30× on the other arm 37.

The third means referred to above consists briefly of three horizontal shaft members 39, 40 and 41 respectively slidably receiving lens holders 23, 24 and 25.

The fourth means above referred to consists of a pair of rails 43 and 44 for slidably receiving the lamphouse housing 20.

The manually operated means above referred to consists of an upright member or joystick 46 mounted on the control panel 26 in front of the screen 11.

An important feature of the present invention is the capability of viewing a film transparency at any one of four different magnifications and to change magnifications by depressing a single pushbutton switch. Actuation of the magnification switch causes three independent operations to be carried on simultaneously and automatically; viz. movement of the lamphouse, interchanging of the condenser lenses and selection of the proper projection lens.

*Lamphouse movement*

Lamphouse 20 is reciprocally moved along rails 43 and 44 by a slow-speed 115 D.C. motor 45 with integral gear reduction which rotates a leadscrew 29 connected to a follower nut 47 mounted on the lamphouse. A cam plate 48 mounted on the lower side of the housing actuates linearly aligned microswitches M35, M36, M38 and M39 which control the lamphouse motor for positioning the lamp for the different magnifications.

Figure 19:
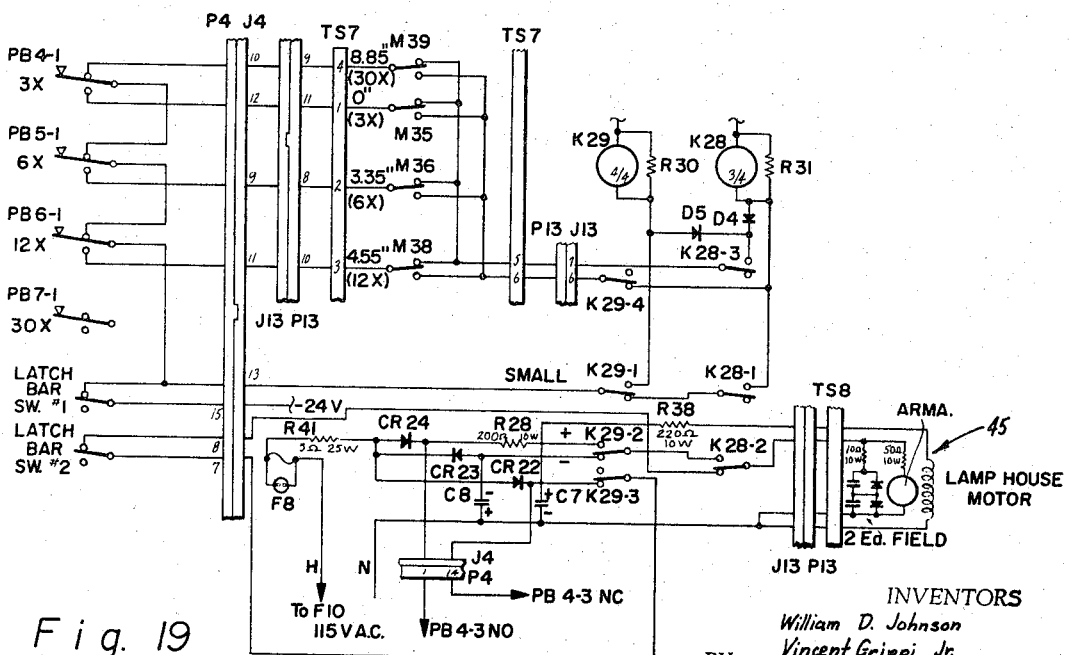
FIGURE 19 is a functional wiring diagram of the lamphouse movement mechanism constructed in accordance with the present invention.

Referring to FIGURE 19; lamphouse movement functional diagram.

The lamphouse "turn-on" procedure for energizing the lamphouse circuit for controlled operation is as follows: Assume that the lamphouse is at the (30×) position and M39 is actuated. When the machine is turned on, −24 volts is applied through latch bar switch No. 1, PB6–1, PB5–1, PB4–1, M39, and contact K29–4 to energize K28. K28–2 operates, applying −150 volts through K29–2 to the motor. The lamphouse moves toward the motor and consequently backs off M39. With M39 deactuated, −24 volts is applied through K28–3 to energize K29. K29–2 transfers, applying a small positive voltage (dropped by resistor R28) to the motor, and the lamphouse travels slowly forward to reactuate M39. With K29–4 transferred, the circuit through M39 and K28 is open and K28 is deenergized. Contact K28–2 drops to open the circuit to the motor and lamphouse travel comes to a stop. K29 remains energized through transferred contact K29–1.

Four pushbuttons are provided on the control panel corresponding with the different magnifications. In FIGURE 19, the 3× magnification corresponds with pushbutton PB4–1, 6× magnification corresponds with pushbutton PB5–1, 12× magnification corresponds with pushbutton PB6–1 and 30× magnification corresponds to the pushbutton PB7–1. Each of the pushbuttons are mechanically connected to one another so that depressing one button automatically deactivates the other pushbutton. In addition, each of the buttons is mechanically connected to both of the latch bar switches No. 1 and 2 so that as the particular pushbutton is depressed, both latch bar switches are momentarily transferred. All switches and microswitches in the diagram are shown in the unactuated condition.

In operation, assuming that the lamphouse is at the (30×) position and it is desired to switch to the 12× magnification, the operation is as follows: As the 12× pushbutton is being depressed, latch bar switch No. 1 opens momentarily to de-energize K29, while latch bar switch No. 2 opens the circuit to the motor. When the pushbutton is completely depressed, the latch bar switches are again closed, and +150 v. is applied to the motor through K29–3 and K28–2. The lamphouse travels forward (away from the motor) at fast speed. The 12× microswitch (M38) is actuated, −24 volts is applied through latch bar switch No. 1, and PB6–1, through M38 and K29–4 to energize K28. −150 volts is applied to the motor through K29–2 and K28–2. The lamphouse travels quickly back toward the motor until M38 is deactuated. Then, −24 v. is applied through M38 and K28–3 to energize K29 and hold relay K28 energized. K29–1 latches relay K29 and K29–2 closes the circuit to apply +150 volts through resistor R28 to the motor. The motor senses the reduced positive voltage and the lamphouse moves slowly back to M38. M38 is again actuated; and since the circuit through K29–4 is now open, K28 is deenergized. K28–2 opens the circuit to the motor, and the lamphouse travel stops.

When the lamphouse is at the (12×) position and it is desired to switch to the 30× magnification, the circuit is energized as follows: As the 30× pushbutton is being depressed, latch bar switch No. 1 opens momentarily to de-energize K29, while latch bar switch No. 2 opens the circuit to the motor. When the 30× pushbutton is completely depressed, the latch bar switches are again closed, and the 12× pushbutton (PB6–1) is completely released. −24 v. by way of J4–15, latch bar switch No. 1, PB6–1, PB5–1, PB4–1 and the actuated 30× microswitch (M39), and K29–4 energizes K28. K28–1 transfers and latches relay K28. K28–2 transfers providing the motor with −150 volts. The lamphouse travels back (toward the motor) at fast speed, until M39 is deactuated. Then −24 volts is applied through M39 and K28–3 to energize K29 and hold relay K28 energized. K29–1 latches relay K29, and K29–2 closes the circuit to apply +150 volts through R28 to the motor. The motor senses a reduced positive voltage and the lamphouse moves slowly back to M38. M38 is again actuated; and since the circuit through K29–4 is now open, K28 is de-energized. K28–2 opens the circuit to the motor and lamphouse travel stops.

If it is desirable to move from the (30×) position to the 6× magnification, the movement is as follows: As the 6× pushbutton is being depressed, latch bar switch No. 1 opens momentarily to de-energize K29, while latch bar switch #2 opens the circuit to the motor. When the pushbutton is completely depressed, the latch bar switches are again closed, and +150 volts is applied to the motor through K29–3 and K28–2. The lamphouse travels forward (away from the motor) at fast speed. As the lamphouse travels forwardly the cam actuates microswitch M36 and −24 volts is applied through latch bar switch No. 1 PB6–1, PB5–1, M36 and K29–4 to energize relay K28. K28–2 transfers to apply −150 volts to the motor. The lamphouse reverses direction and travels quickly back toward the motor until M36 is deactuated. Then, −24 volts is applied through M36 and K28–3 to energize K29, and to hold relay K28 energized. K29–1 latches relay K29, and K29–2 closes the circuit to apply +150 volts through resistor R28 to the motor. The motor senses a reduced positive voltage and moves the lamphouse slowly back to M36. M36 is again actuated; and since the circuit through K29–4 is now open, K28 is de-energized. K28–2 opens the circuit to the motor, and the lamphouse travel stops.

It is possible to switch from one magnification to any other magnification and the lamphouse will move in a manner similar to the examples above described.

*Condenser lens movement*

For 3× magnification no auxiliary condenser lenses are in the optical path. For 6× magnification lenses 5 and 6 mounted in holder 25 are in the optical path. For 12× magnification lenses 4, 5 and 6 in holders 24 and 25 are in the optical path. For 30× magnification lenses 3, 4, 5 and 6 in lens holders 23, 24 and 25 are in the optical path.

Figure 21:
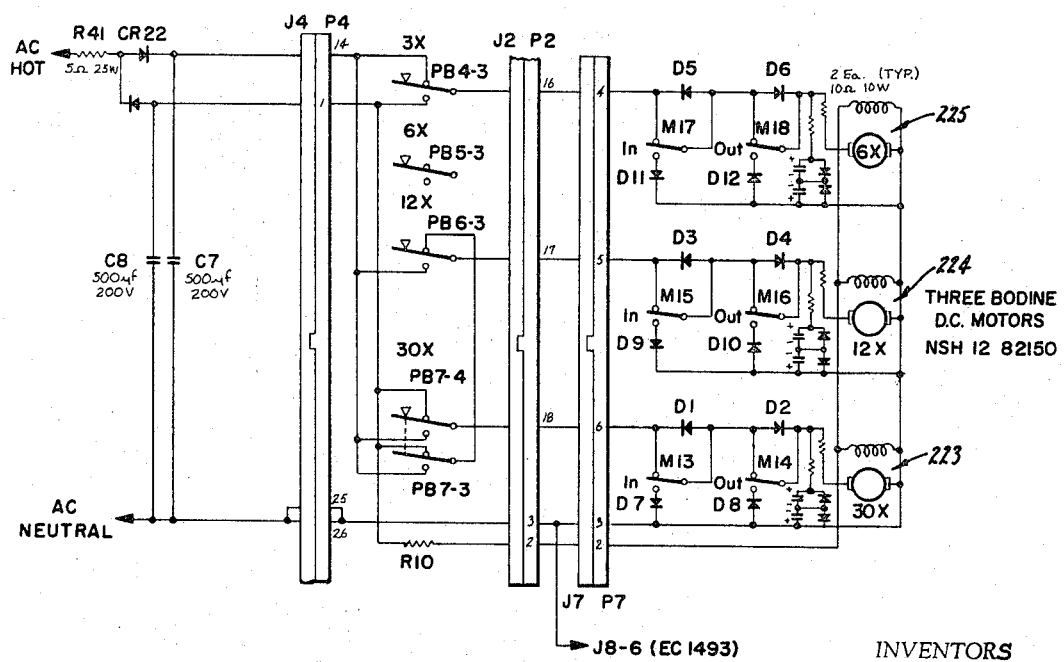
FIGURE 21 is a functional wiring diagram of the condensing lens mechanism constructed in accordance with the present invention.
Figure 18:
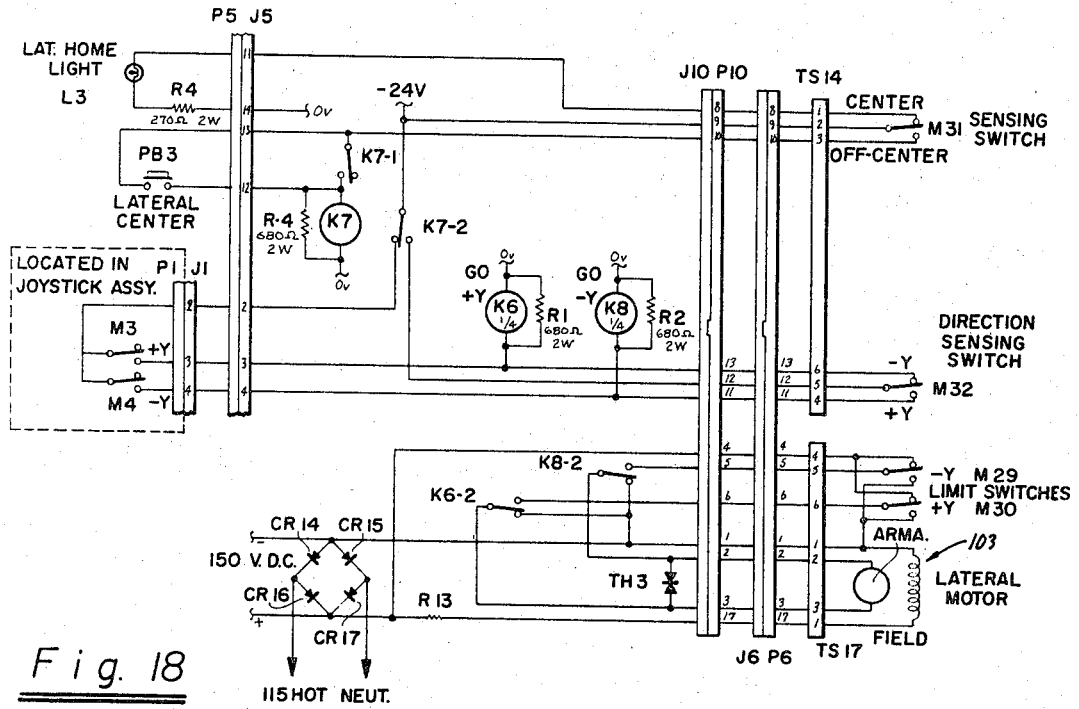
FIGURE 18 is a functional wiring diagram of the lateral movement mechanism of the present invention.

The holders are moved individually by slow speed D.C. motors connected to leadscrews and lead nuts on the holders; holder 25 being driven by motor 225 connected to leadscrew 235 and driving lead nut 245; holder 24 being driven by motor 224 connected to leadscrew 234 and driving lead nut 244; and motor 223 connected to leadscrew 233 and driving lead nut 243. Each lens holder is maintained in a vertical position by bearings 236 mounted thereon which straddle a rail 237. Lens holders 25, 24 and 23 actuate microswitches M17, M15 and M13 respectively when the lenses are in the optical path and actuate microswitches M18, M16 and M14 respectively when they are not in the optical path. A table showing the relation between the motors, lenses, microswitches and magnification is as follows:

The condenser lenses are automatically shifted in and out of the optical path when the magnification pushbuttons mounted on the control panel are actuated. The correlation between the pushbuttons on the control panel and the electrical functional diagram shown in FIGURE 21 is as follows: 3× is PB4–3, 6× is PB5–3, 12× is PB6–3 and 30× is PB7–4 and PB7–3. The electrical circuit shown in FIGURE 21 includes diodes D1 through D12 and CR22 and CR23 placed in the circuit as shown.

In operation in changing from a 30× magnification to a 12× magnification the lens changes would be as follows: Initially, the 30× pushbutton (PB7–4 and PB7–3) is depressed and auxiliary condensing lenses are all in the optical path, with microswitches M13, M15 and M17 actuated. When the 12× button is depressed, the 30× button is released and the 12× button is mechanically latched. A circuit is completed from the −150 volt supply through P4–1, through PB7–4, P2–18, P7–6, through diode D1 and through M14 to the 30× motor. Lens No. 3 is therefore driven out of the optical path. The No. 3 lens holder actuates M14 to break the −150 volt supply to the 30× motor and stop for the travel of the holder. The No. 4, No. 5 and No. 6 lenses then provide the proper light-convergence angle for the 12× magnification.

In changing from the 12× to the 30× magnification pushbutton PB6–3 is depressed and microswitches M15, M17 and M14 are initially actuated. Depression of the 30× button releases the 12× button and the 30× button is mechanically latched. +150 voltage is passed by way of P4–14 through PB7–4, P2–18 and P7–6 through M13, through diode D2 to the 30× motor. Lens No. 3 is therefore driven to a position in the optical path. The No. 3 lens holder actuates M13 to break the +150 volt supply to the 30× motor and stop further travel of the holder. The No. 3, 4, 5, and 6 lenses then provide the proper light-convergence angle for the 30× magnification.

In changing from the 30× magnification to the 6× magnification the operation is as follows: Initially, the 30× pushbutton (PB7–4, PB7–3) is depressed, and all of the auxiliary condensing lenses are in the optical path thus actuating switches M13, M15 and M17. Depressing the 6× button releases the 30× button and the 6× button is mechanically latched. A circuit is completed from the −150 volt supply to P4–1, PB7–4, P2–18, P7–6, through Diode D1 and through M14 to the 30× motor. Lens No. 3 is therefore driven out of the optical path and when it is out of the optical path actuates M14 to break the −150 volt supply to the 30× motor. PB6–3, the 12× button also completes a circuit from the −150 volt supply to PB7–3, PB6–3, P2–17, P7–5 through diode D3 and M16 to the 12× motor, lens No. 4 is therefore driven out of the optical path and actuates M16 to break the −150 volt supply to the 12× motor and stop further travel of the holder. The No. 5 and No. 6 lenses then provide the proper light-convergence angle for the 6× magnification.

Condenser lenses 7 and 8 are fixedly mounted in rotating subplate 94; lens 8 being mounted above lens 7.

*Projection lens movement*

The four projection lenses are selectively moved into the optical path by three 115 volt A.C. motors mounted on the projection turret 33. Motor 211 drives stub shaft 212 to which lens 3× is connected. Motor 214 drives stub shaft 215 to which lens 6× is connected. Motor 217 drives stub shaft 218 to which lenses 12× and 30× are connected. Four pushbuttons mounted on the con-

| Magnification | | | 3× | 6× | 12× | 30× |
|---|---|---|---|---|---|---|
| Aux. Condens. Lens No. | | | None | 5, 6 | 4, 5, 6 | 3, 4, 5, 6 |
| | OPTICAL PATH | | | | | |
| 6× Motor | In | M17 Lenses 5 & 6 | Unactuated | Actuated | Actuated | Actuated. |
| | Out | M18 | Actuated | Unactuated | Unactuated | Unactuated. |
| 12× | In | M15 Lens 4 | Unactuated | Unactuated | Actuated | Actuated. |
| | Out | M16 | Actuated | Actuated | Unactuated | Unactuated. |
| 30× Motor | In | M13 Lens 3 | Unactuated | Unactuated | Unactuated | Actuated. |
| | Out | 14 | Actuated | Actuated | Actuated | Unactuated. | trol panel control the movement of the projection lenses.

Figure 5:
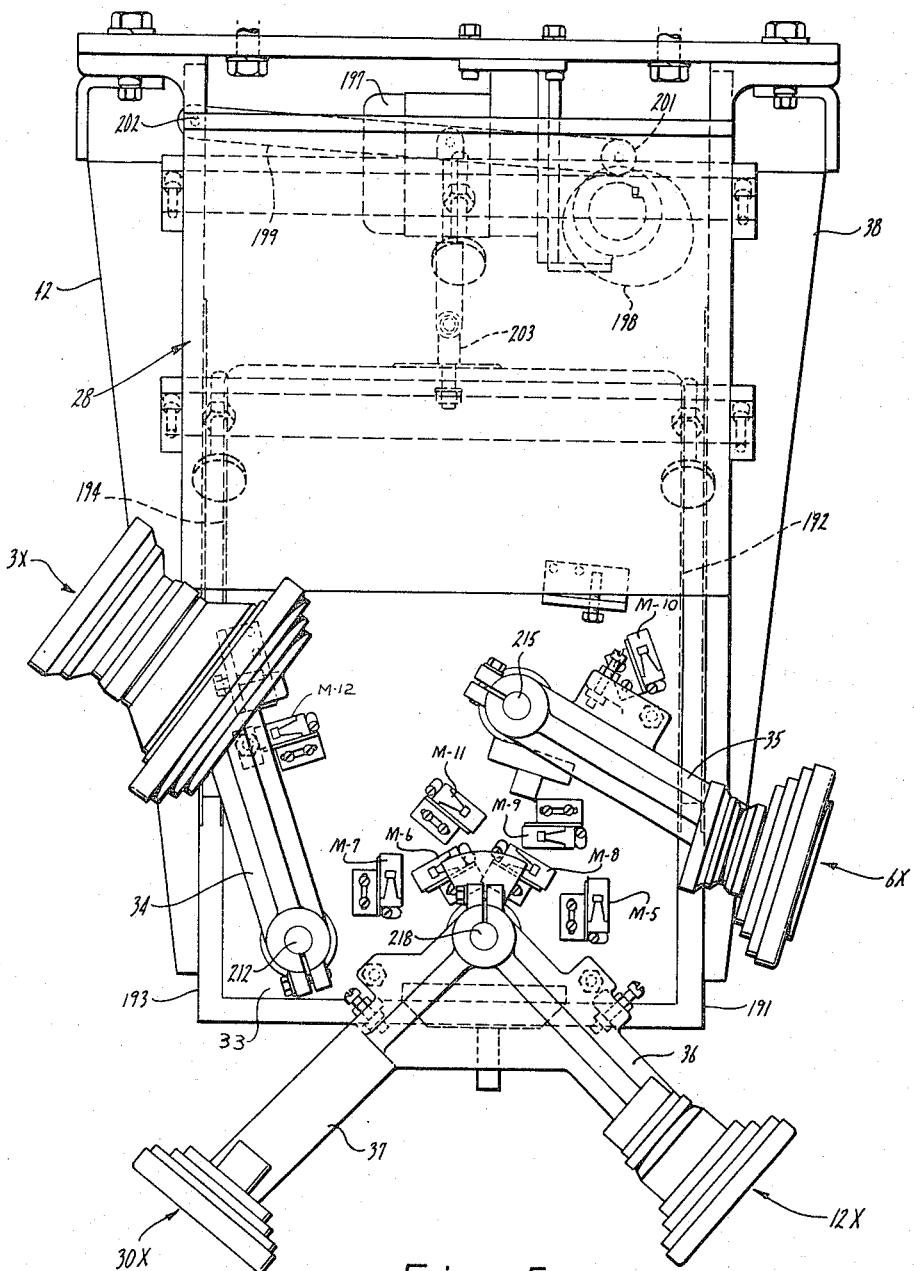
FIGURE 5 is a front elevation view of a portion of the device shown on an enlarged scale with some moving parts rotated for purposes of understanding and taken substantially along the line 5—5 of FIGURE 1.
Figure 6:
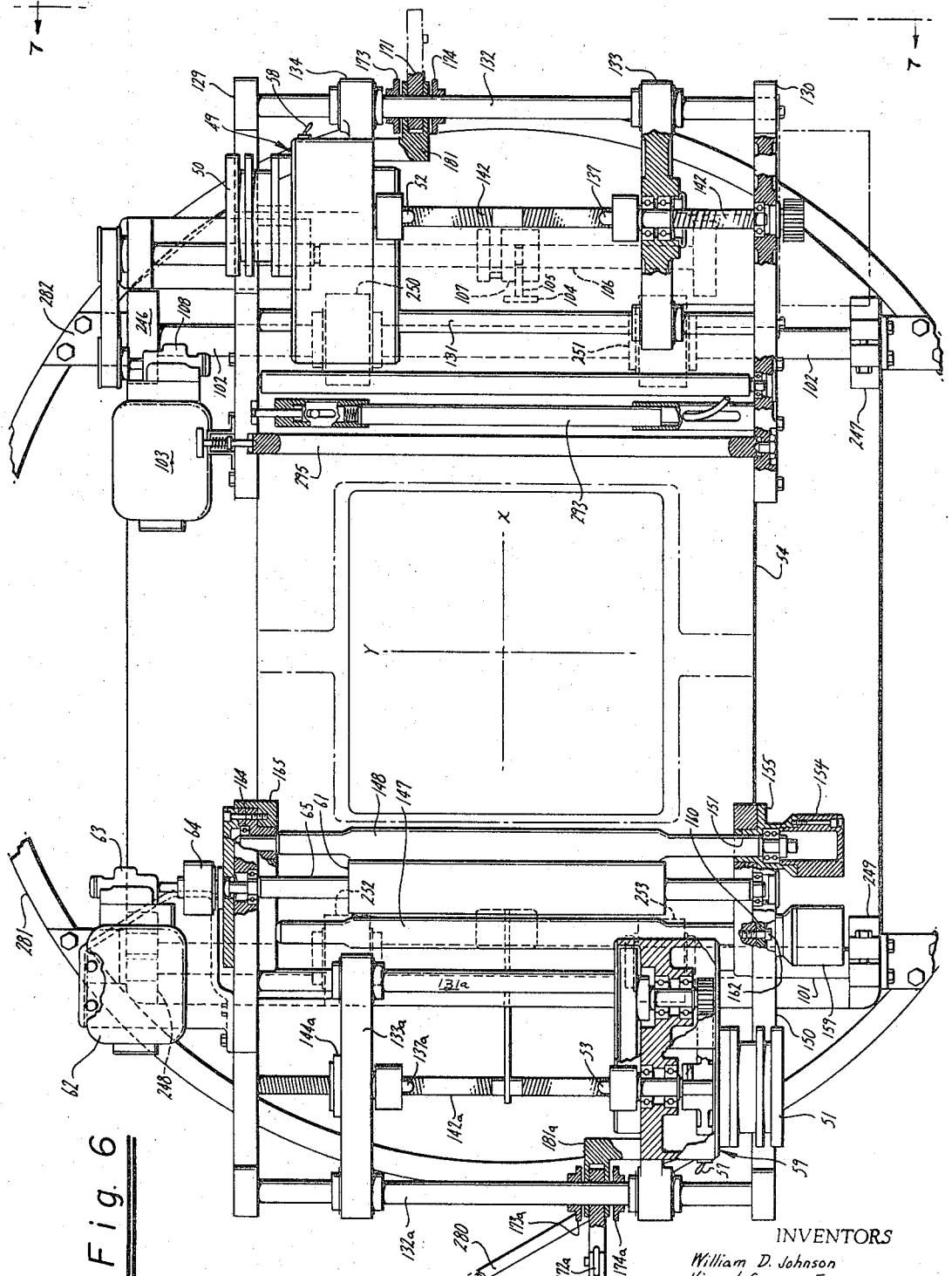
FIGURE 6 is a top plan view of the device shown on an enlarged scale with portions removed for purposes of clarity and taken substantially along the line 6—6 of FIGURE 1.
Figure 7:
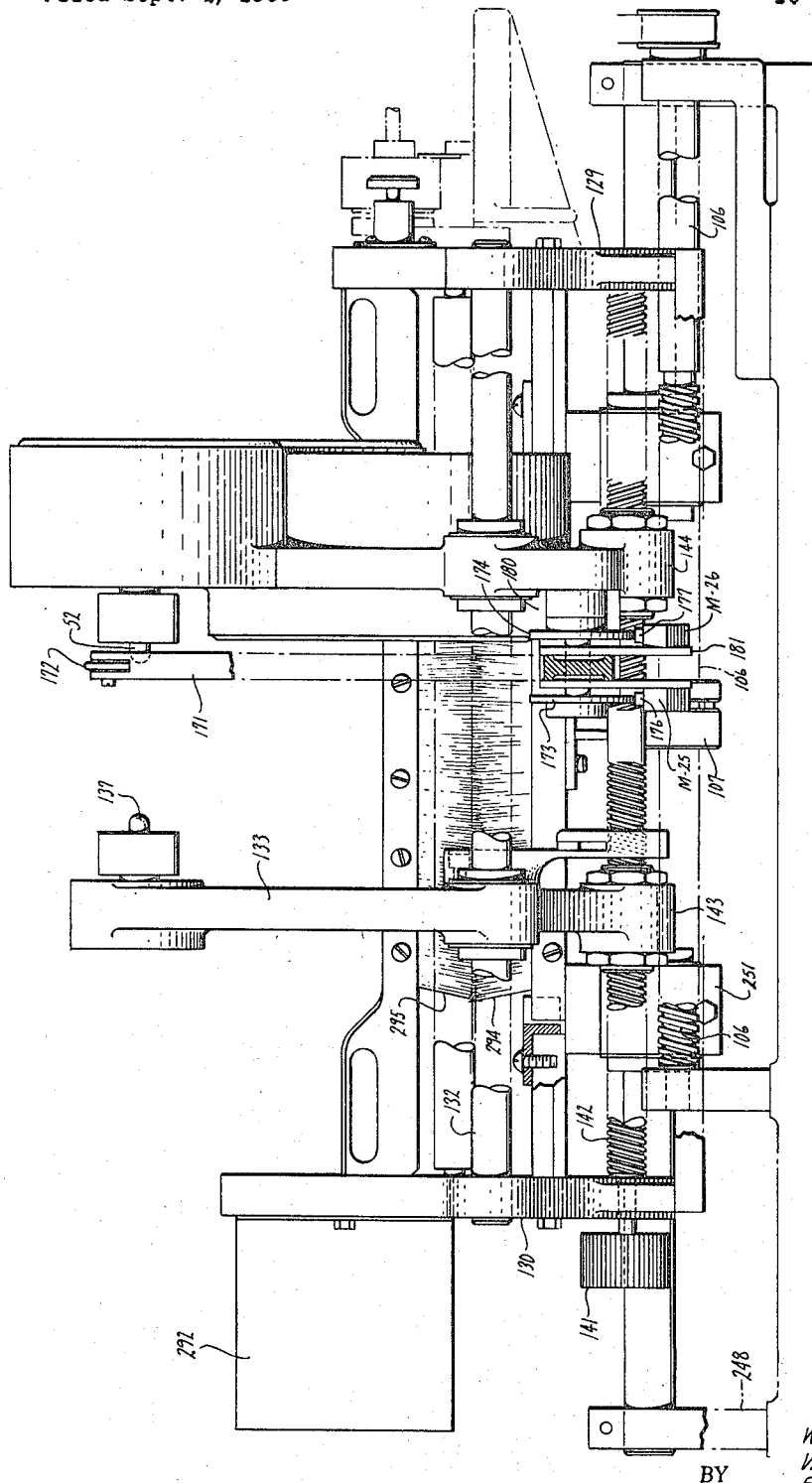
FIGURE 7 is a side elevation view of the device on an enlarged scale with portions removed for purposes of clarity and taken substantially along the line 7—7 of FIGURE 6.
Figure 8:
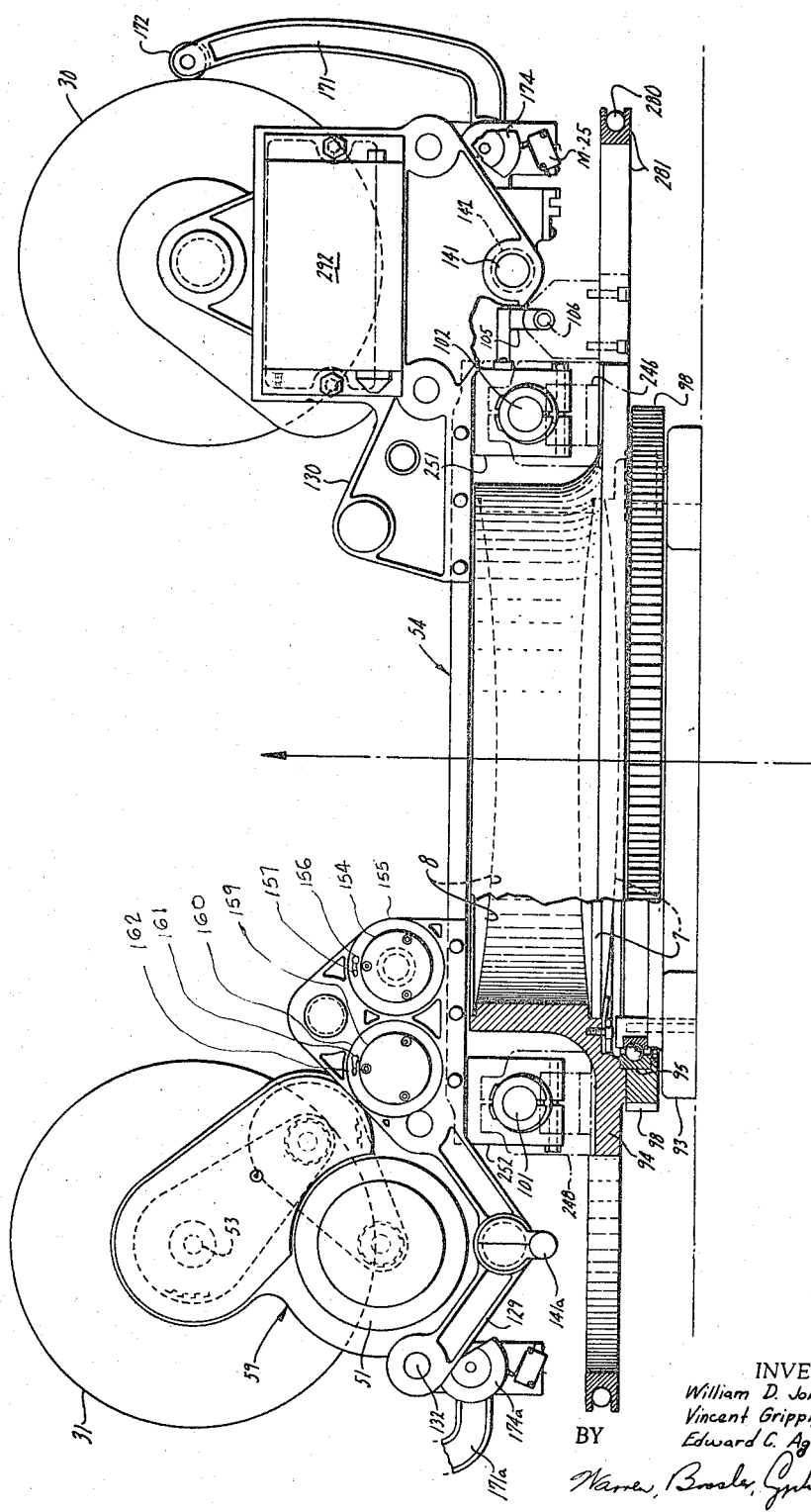
FIGURE 8 is a side elevation view of the device shown on an enlarged scale with portions broken away and other portions removed for purposes of clarity and taken substantially along the line 8—8 of FIGURE 2.
Figure 11:
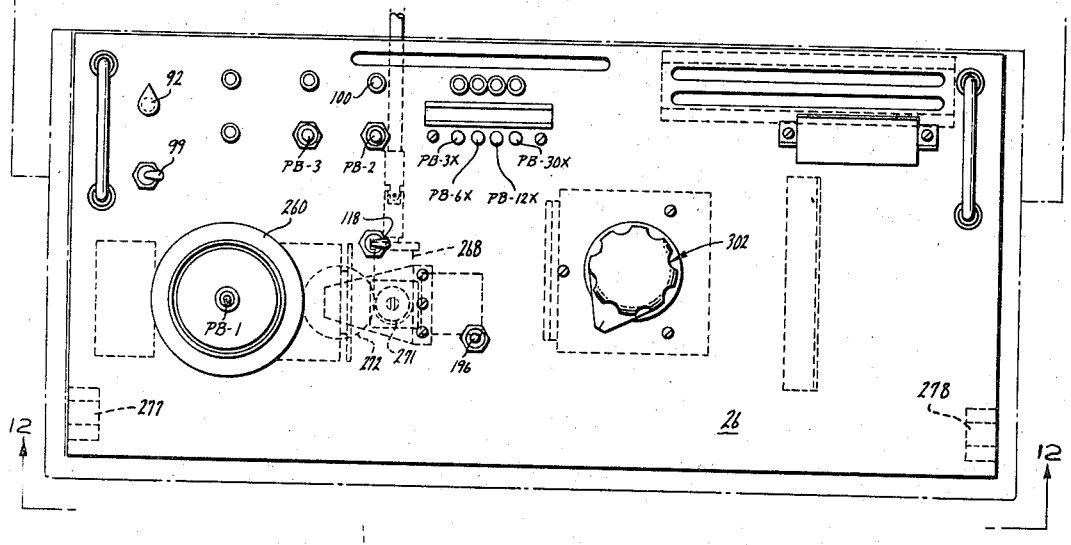
FIGURE 11 is a top plan view of a portion of the device shown on an enlarged scale and taken substantially along the line 11—11 of FIGURE 1.
Figure 12:
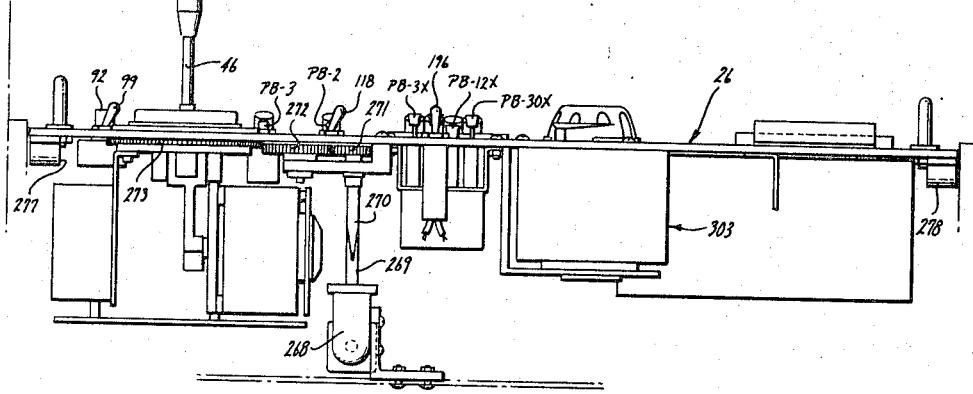
FIGURE 12 is a side elevation view of the device taken substantially along the line 12—12 of FIGURE 11.
Figure 15:
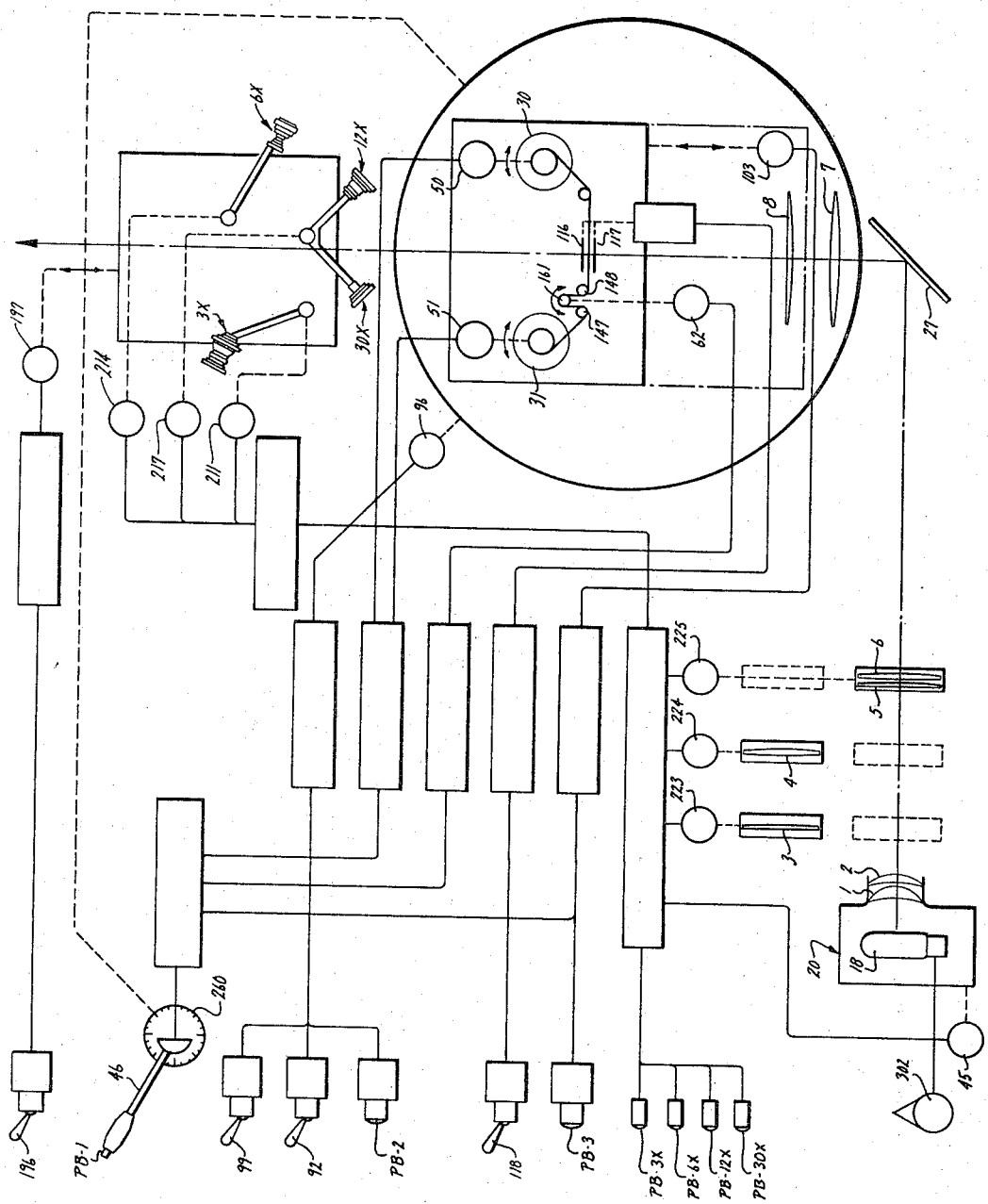
FIGURE 15 is an operational schematic of the device as characterized above.
Figure 22:
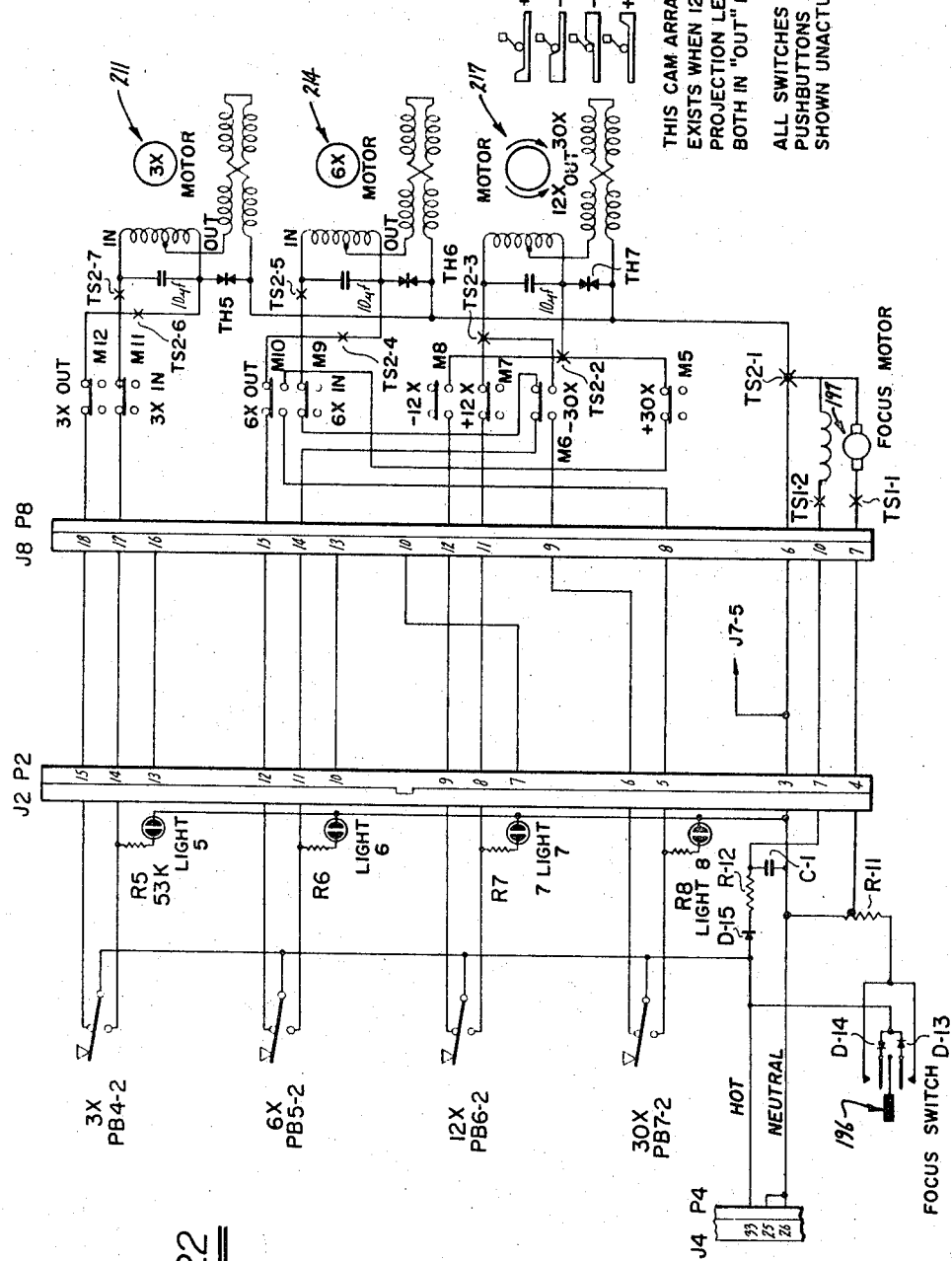
FIGURE 22 is a functional wiring diagram of the projection lens mechanism constructed in accordance with the present invention.

The correlation of the various magnifications with the pushbuttons on the control board and the switches in the functional diagram are as follows: 3× is PB4–2, 6× is PB5–2, 12× is PB6–2, 30× is PB7–2. Each of the pushbuttons are mechanically mounted so that each pushbutton will stay in the "in" position upon depression and all of the pushbuttons are interlocked so that depression of one button releases the previously depressed pushbutton. The movement of the projection lenses in the projection turret in changing from the 30× position to the 12× position is as follows:

At the 30× magnification the condition of the microswitches of the projection turret shown in FIGURES 22 and 5 is as follows:

| | |
|---|---|
| M12—Actuated | M8—Unactuated |
| M11—Unactuated | M7—Unactuated |
| M10—Actuated | M6—Actuated |
| M9—Unactuated | M5—Actuated |

Depressing pushbutton PB6–2 unlatches PB7–2 and latches PB6–2. The "hot" side of the 115 volt A.C. line is connected to the 12×–30× motor 217 through PB6–2 and the 12× microswitch (M7). The motor begins to turn the 12×–30× arm 36, 37 clockwise to move the 12× lens into the optical path. The 12×–30× motor 217 continues running until M7 is actuated, at which point the 12× projection lens is in the optical path.

The operation of the projection lens turret in changing from 12× to 30× magnification is as follows:

The condition of the microswitches of the projection turret in FIGURE 22 is as follows:

| | |
|---|---|
| M12—Actuated | M8—Actuated |
| M11—Unactuated | M7—Actuated |
| M10—Actuated | M6—Unactuated |
| M9—Unactuated | M5—Unactuated |

Depressing pushbutton PB7–2 unlatches PB6–2 and latches PB7–2. The "hot" side of the 115 volt A.C. line is connected to 12×–30× motor 217 through PB7–2 and the microswitch M5. The motor begins to turn the 12×–30× arm 36, 37 counter-clockwise to move the 30× lens into the optical path. The 12×–30× motor continues running until M5 is actuated, at which point the 30× projection lens is in the optical path.

In operating the projection lens assembly from the 30× to the 6× magnification, the operation and the condition of the microswitches is as follows:

| | |
|---|---|
| M12—Actuated | M8—Unactuated |
| M11—Unactuated | M7—Unactuated |
| M10—Actuated | M6—Actuated |
| M9—Unactuated | M5—Actuated |

When switching from the 30× or 12× magnification to either the 6× or 3× magnification, the 30× or 12× lenses, which are both attached to inverted V arm 36, 37 move to an intermediate position where neither lens is in the optical path. In this position none of the microswitches associated with the 12×–30× inverted V arm are actuated. (That is M7, M8, M5, and M6 are unactuated.) Also, in a change from 30× to 6× (or from 6× to 30×) the lens leaving the optical path moves first. This sequence prevents the 6× and 12× lens arms from bumping each other during the switching. Depressing PB5–2 (the 6× pushbutton) unlatches PB7–2 and latches PB5–2. The "hot" side of the 115 volt A.C. line is connected through switch PB7–2 and M6 to the 12×–30× motor. The 12×–30× lens arm moves and releases M6 and stops at an intermediate position. When M6 is unactuated, the "hot" side of the 115 volt A.C. line is then connected through M6, and M9 to the 6× motor which then begins to move the 6× lens clockwise into the optical path. This motion is stopped when M9 (the 6× microswitch) is actuated.

Each of the projection lenses may be moved into the optical path in any sequence of operation of the manual magnification pushbuttons on the control panel.

Fine focusing

The apparatus here includes a fifth means for mounting the projection lenses for movement on the optical path to and from the film plane for fine focusing the film image upon the screen. Fine focusing is accomplished by mounting film turret 33 for vertical sliding movement on frame members 38 and 42 suspended from the top frame members of the apparatus. Turret slide rail 191 interlocks with guide 192 mounted on frame member 38 and slide rail 193 interlocks with guide 194 mounted on frame member 42 for permitting vertical motion.

Reference FIGURE 22. Raising and lowering of the turret is controlled from a finger engageable focus switch 196 which is connected to a 115 volt D.C. gear reduced motor 197. Movement of switch 196 in one direction applies −115 v. through diode D13 and R11 to motor 197, and movement in the other direction reverses the direction of the motor by applying +115 v. through diode D14 and R11 to motor 197. Motor 197 rotates cam 198 which moves lever 199 by means of cam follower 201. Lever 199 is pivoted at point 202 and connected to the turret by link 203. Spring 204 connected to frame member 206 and the turret provides a counter balance.

Film drive

Another feature of the present device is the capability of variably moving the film at each magnification by the operation of a minimum of hand operated controls located conveniently on a control panel adjacent the viewing screen.

The film drive mechanism for moving the film across the optical path consists briefly of a supply reel 30 for a length of film to be viewed and a motor drive 50 therefor; a take-up reel 31 for the film and a motor drive 51 therefor, the reels being mounted on a film transport 54 for guiding the film in a plane across the optical path; drive control means for selectively and variably energizing the take-up reel motor drive and supply reel motor drive for driving the film at varying speeds forwardly and backwardly; tension control means selectively energizing the motor drive for automatically applying tension on the film in either driven direction of the film; first switch control means for selectively determining the direction of rotation of the take-up reel motor drive when energized by the tension and drive control means; and second switch control means for selectively determining the direction of rotation of the supply reel when energized by the tension and drive control means; the switch means permitting operator selection for viewing the film emulsion side up or down.

The motors for the reels are here 24 volt D.C. printed circuit electric motors having a maximum speed of approximately 3300 r.p.m. and are standard items manufactured by Photo Circuits Corporation, Printed Motors, Inc. Motor 50 is connected to drive spindle shaft 52 by a gear reducer means 49, and motor 51 is connected to drive spindle shaft 53 by a separate gear reducer means 59.

Tension is applied to the film by providing a separate electrical circuit to the printed circuit motors for selectively variably energizing them for applying tension on the film in either driven direction of the film.

First switch control means here consists of a reverse toggle switch S12 electrically connected to the take-up reel motor 51 and the second switch control means consists of a toggle switch S13 electrically connected to the supply motor 50. The switches are located adjacent their respective motors so that the operator in loading the film can pre-select the direction of the motor drives so that film can be shown either emulsion side up or emulsion side down from the supply to the take-up reel regardless of how the film is wound on the reel. Switch S12 is provided with a manually engageable handle 57 and switch S13 with a manually engageable handle 58.

The present apparatus may be driven at a fast speed mode range by the reel motors and also at a slow mode speed range by a capstan roller 61 interposed between the reels and driven by a capstan motor drive 62. Motor 62 here shown is a standard 115 volt D.C. connected to the capstan roller by a right angle drive means and speed reducer 63 connected to a clutch 64 which is in turn connected to shaft 65 of the capstan roller.

The drive control means for variably energizing the reel motors and the capstan motor here consists of a variable transformer 71 having a winding face 72 and an electric contact 73 movable thereover; and reversing switches M1 and M2 connected for actuation by handle 46 and electrically connected for reversing the polarity of the winding depending upon the fore and aft positions of the handle.

The variable transformer here consists of a modified Powerstat type 21 manufactured by Superior Electric of Bristol, Conn. The Powerstat is modified by removing the stop member which ordinarily prevents the brush from rotating 360 degrees and by filling the depression between the high and low side of the windings with a non-conducting material so that the neutral area between the windings is at the same elevation as the winding face. The filled-in area becomes the neutral area and the winding on either side of the neutral area is a low voltage area because of the reversing of polarity of the winding by the microswitches. A shaft 77 is mounted for rotation through the center of the transformer and is connected to an arm 78 which carries the contact 73. A pinion gear 80 is mounted on the other end of the shaft for engagement with and rotation by a gear segment 81 mounted on a quadrant-shaped member 82 formed with a cam face 83 which actuates switches M1 and M2. When handle 46 is moved in the $+X$ direction cam follower 84 actuates switch M2 and when the handle is moved in the $-X$ direction cam follower 85 actuates switch M1. Quadrant member 82 is connected to handle 46 by a universal joint 86 so that the handle can be moved in the X direction as well as in the Y direction as indicated by the arrows on the drawing. The weight of the variable transformer is counterbalanced by a weight 87.

*Scan mode*

Figure 16:
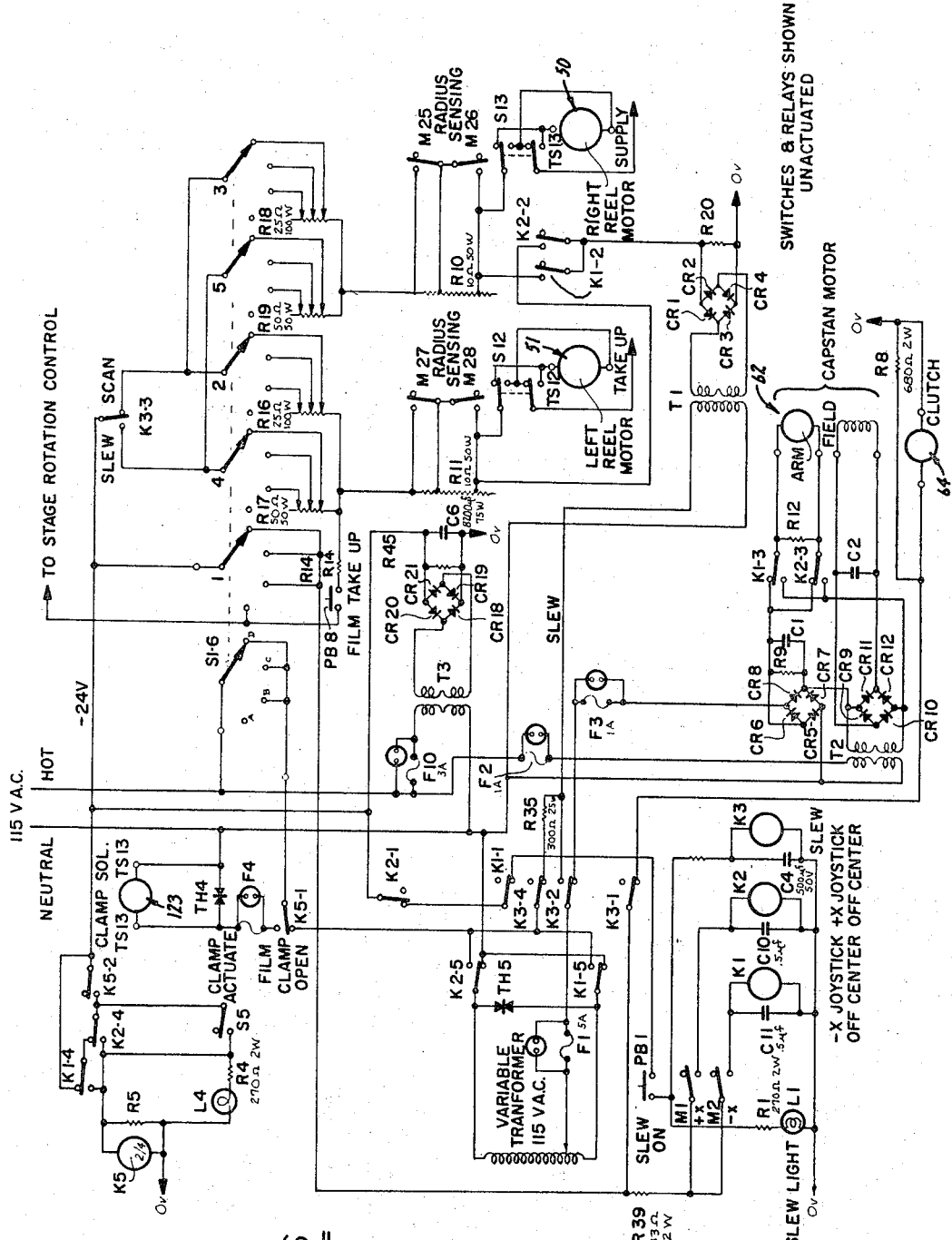
FIGURE 16 is a functional wiring diagram of the film drive mechanism constructed in accordance with the present invention.

In general, moving the joystick lever changes the position of the transformer wiper contact and thus changes the A.C. voltage output. This is rectified and applied to the D.C. drive motors through suitable relay logic as set forth below. Refer to FIGURE 16.

With the joystick at neutral position along the X-axis, both primary terminals of the variable transformer are connected to neutral by contacts K1–5 and K2–5. Deflection of the joystick will operate either relay through either microswitch M1 or M2 and connect the primary terminal farthest from the normal position of the swinger to the "hot" line. This feature insures that, when the joystick is near neutral, the variable transformer output is also near zero.

In the neutral position, the film tensioning torque is applied to the reel motors through the tensioning circuits as above described but no driving power is supplied to these reel motors. Capstan motor 62 is shorted out and only the clutch connecting the capstan roller to the capstan motor is energized by the 24 volt line through switch S1–1, and relay contact K3–1.

Deflection of the joystick toward the $(+X)$ direction actuates microswitch M2 and energizes relay K2. The variable transformer is energized by the 115 volt A.C. line through switch S1–6 and the transferred relay contact K2–5. In the scan mode, the output from the swinger 78 goes through relay contact K3–2 to the bridge formed by CR5, CR6, CR7, and CR8, thence through relay contact K1–3 to the armature of the capstan motor. Deflection of the joystick along the $(+X)$ direction energizes the take-up reel motor through a separate power drive circuit in which the current flows through switch S1–6, relay contact K3–4, resistor R35, transformer T1, bridge rectifier CR1, CR2, CR3, and CR4 transferred relay contact K2–2 and reverse toggle switch S12.

Deflection of the joystick in the $(-X)$ direction actuates microswitch M1 and energizes relay K1. The transferred relay contact K1–5 connects the other end of the variable transformer to the 115 volt A.C. line and the output from the swinger goes through relay contact K3–2, through the bridge CR5–CR8 and relay contact K2–3 to the armature of the capstan motor thus reversing the direction of the capstan motor. Some driving current is supplied to the supply reel motor through the same driving circuit previously described for driving the take-up reel motor except that relay contact K1–2 is actuated and power flows to the supply reel motor through switch S13.

*Dither*

The capstan roller is here driven by a D.C. motor. In order to provide smooth starting of the roller at low voltage the armature of the motor is kept in constant oscillating motion by a small A.C. voltage superimposed upon the D.C. line voltage to the armature of the motor. This A.C. voltage is here supplied through transformer T2, and thence through either relay switch K1–3 or K2–3. Constant D.C. voltage is applied to the capstan motor field through transformer T2 and bridge rectifier CR9, CR10, CR11, and CR12.

*Slew mode*

In the slew or fast mode, the reel motors supply the driving force to the film, while the capstan motor is declutched and the capstan roller free wheels.

Slew mode is effected by depressing the slew pushbutton PB1 located on the handle of the joystick which energizes relay K3 through relay contacts K1–1 and K2–1 in the 24 volt supply circiut. It is to be noted that relay K3 can only be energized by pushbutton PB1 when the joystick is at the neutral position since either relay contact K1–1 or relay contact K2–1 is energized upon deflection of the joystick from neutral thereby removing the 24 volt supply from pushbutton PB1. When the joystick is moved off center in the $+X$ direction, microswitch M2 is actuated to energize relay K2. Capstan motor 62 is declutched by transferred relay contact K3–1 and the roller free wheels. Power is supplied to the take-up reel motor through the swinger from the variable transformer via transferred relay contact K3–2 to transformer T1 thence through rectifier bridge CR1–CR4 and through relay contact K2–2 and reverse toggle switch S12.

The film direction is reversed by moving the joystick in the $-X$ direction thereby energizing relay K1 and power is supplied to the supply reel motor 50 in the same manner except that the relay contact K1–2 is transferred thus supplying current through switch 13.

It is to be noted that in the slew mode, relay contact K3–3 is transferred thereby reducing the resistance in the tensioning circuit to the reel motors as hereinafter explained.

*Film clamp assembly*

The film viewer is provided with platen means mounted intermediate the reels and having a pair of transparent plates 116 and 117 movable into and out of clamping engagement for securing the film in a plane across the optical path for fine focusing. A manually operable platen control means having a manually engageable switch handle 118 mounted on the control panel remotely actuates the platen means.

The clamp assembly is mounted on the film transport 54 and may be constructed in various ways and here consists of a frame 121 surrounding and holding the glass plate 117; glass 116 mounted in a surrounding frame 122 which is pivotally mounted for movement away from plate 117 to permit easy loading of the film; and a solenoid assembly 123 here connected to a rocker arm assembly 124 for moving the plate into and out of clamping engagement with the film. A spring lock 126 engages handle 127 connected to frame 122 for securing plate 116 in position.

Figure 17:
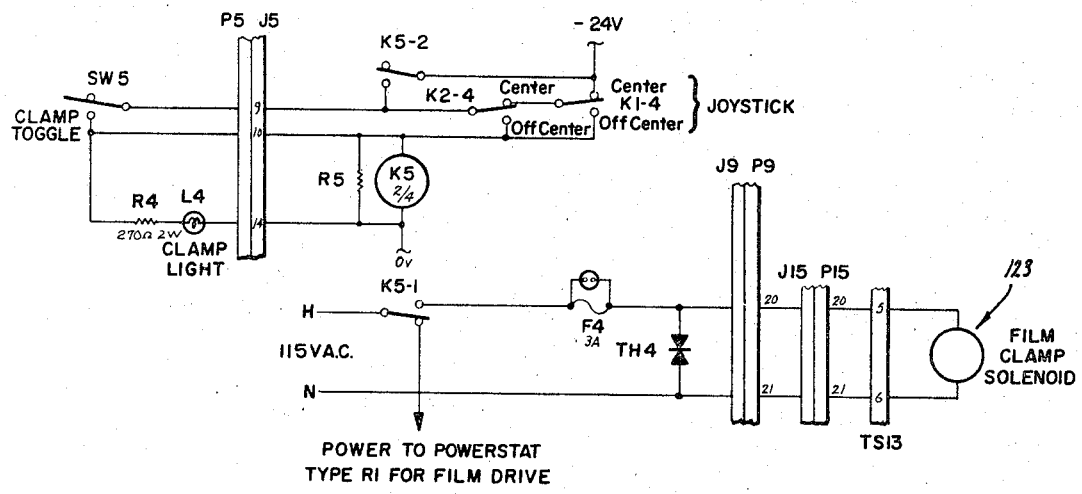
FIGURE 17 is a functional wiring diagram of the film clamping mechanism constructed in accordance with the present invention.

Referring to FIGURES 17 and 16 the film clamp switch SW5 is energized through relay contact K1-4 and K2-4 connected to the 24 volt line. Throwing switch SW5 energizes relay K5 which in turn transfers relay contact K5-2 thereby latching relay K5. Contact K5-1 is transferred by relay K5 and applies 115 volt A.C. to the film clamp solenoid thereby clamping the film.

Several important interlocks are provided to prevent actuation of the film clamp during movement of the film, actuation of the film drive during clamping, or sudden applications of power to the drive motors immediately after unclamping the film.

If the joystick is actuated while the film is clamped, relay contacts K1-4 and K2-4 will transfer, but no power will be applied to the drive motors because K5-1 is applying the power to the clamp solenoid and not to the variable transformer. Thus, the film cannot be driven when the clamp switch is actuated.

If the joystick is held deflected and the film clamp switch is then switched from on to off position, power will be provided to relay K5 through relays K5-2 and K1-4 or K2-4. Relay K5 will not be de-energized until the joystick is returned to the neutral position. Thus a sudden application of voltage to the drive motors cannot occur.

If the joystick is deflected, the film clamp cannot be actuated since either K1-4 or K2-4 will be transferred and prevent relay K5 from being energized and thereby energizing the solenoid. Thus the clamp cannot be actuated during movement of the film.

*Lateral motion*

The image on the screen may be moved to the right or left by a corresponding movement of the joystick. Lateral movement is effected by mounting the film transport assembly 54 on a pair of lateral rails 101 and 102 carried by supports 246, 247, 248 and 249 mounted on the rotating subplate 94. A D.C. motor 103 with integral gear reduction 108 mounted on the rotating subplate drives a leadscrew 106 connected to an anti-backlash 107 which in turn is connected to the film transport by a dowel pin 105 and bracket 104. The transport rides rails 101 and 102 on slide bearing supports 250, 251, 252 and 253.

Movement of the joystick in the lateral Y axis direction causes arm 110 of the joystick assembly to pivot about pin 111 and actuate either switch M3 or M4 which energizes either relay K6 or K8 respectively. Relay contacts K8-2 or K6-2 transfer to apply power through the lateral drive limit switches M29 and M30 to the lateral drive motor. When the joystick is returned to the lateral neutral position, relays K6 or K8 are de-energized and contacts K8-2 and K6-2 short out and dynamically brake the motor, insuring positive stopping and smooth direction-changing. Ball detent 112 rides on arm 110 and bears against spring detent arm 113 which is positioned to hold the joystick on its X axis and prevent unintended lateral movement.

Limit switches M29 and M30 at the extreme limits of travel prevent further actuation of the lateral motor even though the joystick control assembly calls for further movement in the direction of the limit switch. The limit switches also provide dynamic braking when the assembly has reached the extreme limits. In order to move the stage in the opposite direction, the joystick must be moved in the opposite direction to back the stage off the limits.

The film transport stage may be returned automatically to the lateral center position from either lateral position by pressing the lateral center pushbutton PB3 on the control panel, overriding the lateral control of the joystick (switches M3 and M4). Relay K7 energizes through sensing switch M31 which is actuated only when the stage is off center and the relay K7 is latched by relay contact K7-1. Relay contact K7-2 switches the 24 volts from the joystick control to the direction sensing microswitch M32 to selectively energize either relay K6 or K8. Power is applied to the motor through relay contacts K6-2 or K8-2 to drive the stage directly to center. When the stage reaches the center position, microswitch M31 is actuated to drop out relay K7 thereby de-energizing either relay K6 or K8 which in turn deactivates either relay contacts K6-2 or K8-2 thereby de-energizing the lateral motor and turning on the lateral center light L3.

*Image rotation*

The image on the screen may be rotated either clockwise or counter-clockwise by means of a rotational control means having a hand engageable knob 92 mounted on the control panel for actuating switch SW6. Rotation is accomplished by constructing the device with a base 93 and a subplate 94 mounted for rotation on ring bearing 95. A slow speed D.C. motor 96 mounted on the base and having an integral gear reduction gearing 97 connected to a pinion gear drives a ring gear 98 mounted on the rotating subplate.

Figure 20:
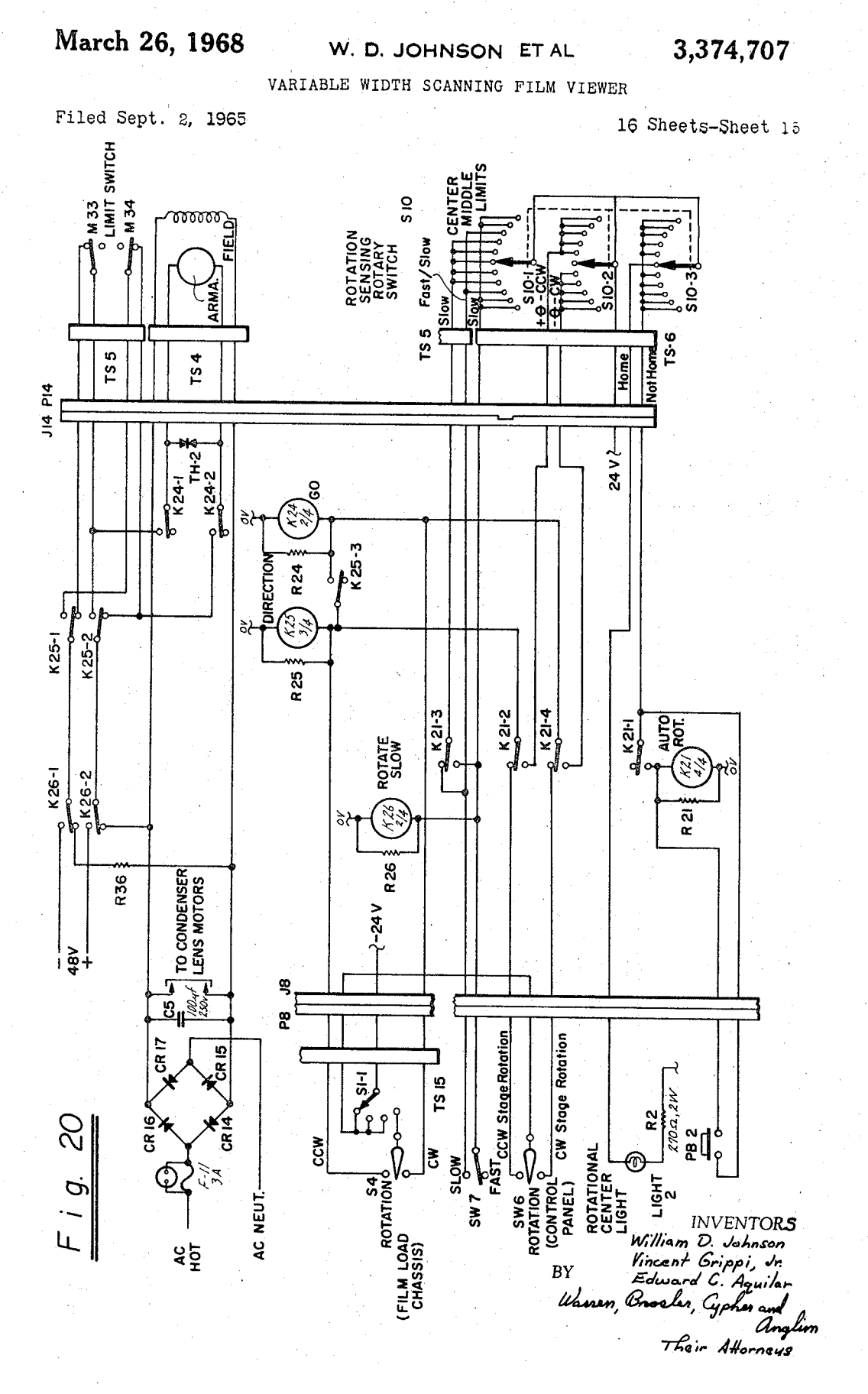

Referring to FIGURE 20; stage rotation functional diagram.

If the switch SW6 is deflected clockwise, relay K25 is energized through relay contact K21-2. Relay K24 is in turn energized by relay contact K25-3. Either −48 volts or −150 volts is applied through relay contacts K26-1, K25-1, microswitch M34 and relay contact K24-2 to the motor armature, causing the rotating subplate, the transport assembly and reels, hereinafter referred to as the "stage" to rotate counter-clockwise and the image on the screen to rotate clockwise (the projection mirror reverses the image). The voltage return path is through relay contacts K24-1, K25-2, K26-2 to the +48 volt or +150 volt power supply.

If switch SW6 is rotated counter-clockwise, relay K24 is energized through K21-4 and −48 volts or −150 volts is applied through relay contact K26-1, K25-1, limit switch M33 and relay contact K24-1 to the motor armature, causing the stage to rotate clockwise and the image to rotate counter-clockwise. The voltage return path is through relay contacts K24-2, K25-2, and K26-2 to the plus side of the 48 volt or 150 volt power supply.

A fast-slow switch SW7 having a handle 99 located directly below the stage rotation knob controls stage rotation speeds in conjunction with switch S10-1. At the fast setting of SW7, relay K26 is de-energized, providing a path from the 150 volt supply through relay contact K26-1 and the appropriate switch contacts to the motor. This drives the stage "fast" through a middle region of its travel (between one limit and the center position). As the stage nears rotational center, relay contact K21-3 keeps the "slow" circuit to relay K26 open so that the stage continues to travel fast through rotational center.

At the slow setting of switch SW7, relay K26 is energized from the "slow" line. Relay contacts K26-1 and K26-2 transfer to apply 48 volts through the appropriate switch contacts to the motor to drive the stage slowly through the middle region of travel and through rotational center.

Limit switches are provided to automatically deenergize the stage rotation motor at pre-selected points in either direction of rotation. As the stage nears either limit of travel, the rotation-sensing rotary switch S10-1 energizes relay K26 (if it is not already energized by the slow setting of the fast-slow switch). Relay contacts K26-1 and K26-2 transfer to apply 48 volts to the motor and slow the stage. At the limit, power is removed from the motor by limit switch M33 or M34, and motion thus stops even though the stage rotation knob is held off center. Moving the control knob in the opposite direction will move the stage off the limit.

Automatic homing is provided by means of a rotational center pushbutton PB2 which overrides the stage rotation switch SW6. Pushbutton PB2 energizes relay K21 from the 24 volt line through switch S10–3 and is latched by relay contact K21–1. Contacts K21–2 and K21–4 transfer, breaking the circuit from the switch SW6 control and closing the automatic control circuit between relays K25 and K24 and switch S10–2. If the stage is on the plus $\phi$ position, K25 and K24 will be energized to drive the stage counter-clockwise; if it is in the minus $\phi$ area, relay K24 will be energized to rotate the stage clockwise. A potential of −48 or −150 volts D.C. is applied to the motor, depending on the setting of the fast-slow switch and the position of switch S10–1. As the stage nears home in the automatic centering mode, relay K26 is energized through switch S10–1 and relay contact K21–3, even though the fast-slow switch may be at the fast setting. This action slows the rotation before the stopping point and thus prevents overshoot. At the center position, switch S10–3 opens the holding circuit (relay contact K21–2) to stop the motor and light the rotational center lamp 100 on the control panel.

A stage azimuth indicator 260 on the control panel rotates with the stage to indicate the position of the stage relative to the front of the console. The joystick also rotates with the stage so that the X and Y axis motions of the joystick are always relative to stage azimuth, and the image motion on the screen always follows the direction of joystick deflection. The joystick assembly is driven by a spur gear 262 driven by ring gear 98, and connected to a right angle drive 263, linkage 264, universal 265, linkage 266, universal 267, right angle drive 268, stub shaft 269, stub shaft 270, gear 271, gear 272 and gear 273. Shaft 269 is formed with a groove and the end of shaft 270 is formed to register with the groove to form a parting joint so that the panel 26 may be pivoted about hinges 277 and 278 for access to the controls.

Power to the motors riding the rotating stage is supplied by a cable 280 carried by a rim 281 attached to the rotating subplate as by brackets 282 and fed from a cable reel 283. Tension is maintained on the cable by a counter-weight system attached to the drum consisting of a cable 285, pulley 286, pulley 287, pulley 288, counter-weight 289 and pulley 290.

Reel holding assembly

The present device is capable of handling films of various widths. In order to center the image of the film in the center of the screen it is necessary to mount the reels so that a line drawn between their centers intersects the center line of the optical path. The reel mounting assembly here consists of a pair of guide rails 131 and 132 connected to side supports 129 and 130 and mounted parallel to the Y axis of the film gate; a pair of upstanding supports 133 and 134 mounted in spaced relation to one another for sliding movement on the rails; a drive spindle 52 and a driven spindle 137 mounted on the upstanding supports with their free ends dimensioned and positioned for receiving the ends of a film reel; and drive means for conjointly moving the supports so as to position the spindle ends equi-distant the X axis of the film gate so that reels of varying widths may be mounted on the spindles with their center lines coinciding with the X axis of the film gate.

In the preferred form of the reel holding assembly, rotation of a hand crank 151 connected to a leadscrew 142 drives a follower nut 143 connected to support 133 and oppositely threaded follower nut 144 connected to support 134. Rotation of the crank causes simultaneous and equal movement of supports 133 and 134.

A similar assembly is provided for the take-up reel consisting of guide rails 131a and 132a, side supports 150 and 165, upstanding supports 133a and 134a, a drive spindle 53 and a driven spindle 137a, hand crank 141a, leadscrew 142a, follower nut 143a and follower nut 144a.

Film loading

To further facilitate loading of the film in the device, idler rollers 147 and 148 positioned on either side of the capstan roller are removably mounted. As here shown, end support 150 is formed with openings 151 and 152 dimensioned to removably receive rollers 147 and 148 respectively. A hand engageable knob 154 is connected to one end of roller 148 and is formed with a flange 155 having a key slot opening 156 formed therein for receiving a button-headed stub 157 which locks the guide roller in place upon rotation of knob 154. Guide roller 147 is similarly equipped with a knob 159, a flange 160, an opening 161 and a button stub 162. The distal end of roller 148 is journaled in a bearing 164 mounted in side support 165 and the distal end of roller 147 is similarly journaled in support 165.

Electrical controls are placed near the film transport assembly to control and position the assembly for ease in loading film. Film tension switch S1 is placed in the load position by rotating its switch arm until it is in registration with contact A thereby disabling the joystick controls, the film clamp switch S5, and the stage rotation switch SW6 on the console control panel and the static eliminator assembly on the film transport. Load switch S1 also makes it possible to energize the film take-up switch PB8 and the stage rotation switch S4 on the film load chassis. In order to load the film on either the supply or take-up reels, chassis rotation switch S4 is rotated either clockwise or counterclockwise until the desired reel is rotated to the desired angle for ease in loading the film. If switch S4 is rotated in a clockwise direction, relay K24 is energized thereby energizing the armature to the rotational motor 96 through relay contacts K26–2, K25–2, K24–2, K24–1, limit switch M33, contact K25–1, and contact K26–1. In like manner, counter-clockwise rotation of film load switch S4 energizes relay K25 and relay K24 through relay contact K25–3; thereby reversing the direction of the current to the armature of the rotational stage motor. D.C. current is supplied through relays K26–2; K25–2, K24–1, K24–2, limit switch M34, relay contact K25–1 and relay contact K26–1.

When the film has been placed on the reels, the take-up reel motor is energized by depressing the film take-up pushbutton PB8 thereby supplying current through resistor R11 and switch S12.

Tension is then placed on the film by rotating switch S1 so that the switch arm corresponds with one of the switch terminals B, C or D. Switch terminal B corresponds to the proper tension for a 70 millimeter film, terminal C corresponds to the proper tension for a 5 inch film, and terminal D corresponds to the proper tension for a 9.5 inch film.

Film tensioning

Reference FIGURE 16.

Film tensioning is provided by the two D.C. reel motors 50 and 51 which are energized from the 24 volt line through relay switch K3–3. The amount of tension applied to the film depends on the width of the film being viewed, the radius of the film on the reel, and the film drive mode (scan or slew), and is varied by inserting different values of resistance in series with the reel motors.

The standard film widths are 70 millimeters, 5 inches and 9.5 inches. The film tension switch S1 on the film load chassis determines the range of tensioning available for each width by switching resistors R16 and R18 in the scan mode and R17 and R19 in the slew mode. Resistors R16 and R18 have a relatively smaller resistance value than resistors R17 and R19 in order to permit a relatively greater flow of current to the reel motors in the scan mode; thereby creating a larger tensioning torque on the reels.

Radius sensing

The apparatus is provided with first and second radius-sensing means; the second means including an arm 171 mounted for engagement with and displaceable by the film on the supply reel; the second means being electrically connected in a circuit to the supply reel motor drive for controlling the current thereto as a function of the displacement of the arm thereby applying a film tensioning torque on the supply reel as a function of the radius of the film on the supply reel.

The radius-sensing mechanism for the supply reel here consists of a roller 172 rotatably mounted on arm 171 for engaging the film, cams 173 and 174 mounted for rotation on the arm for sequential displacement of cam followers 176 and 177 for actuating microswitches M25 and M26 respectively. Spring 180 biases arm 171 to a film engaging position. Arm 171 is pivotally mounted on a bracket 181 connected to support 134. Microswitches M25 and M26 are connected to bracket 181.

Microswitches M25 and M26 are connected to a tapped resistor R10, and initially are actuated to short out part of the resistance and allow more current to flow to the supply reel motor. As the radius decreases, M25 and M26 are sequentially deactuated, adding resistance and thereby decreasing the motor torque to keep the film tension substantially constant. Likewise, the radius sensing arm for the take-up reel motor is electrically connected to variable resistor R11 and as the radius of the film on the spool increases the cams actuate microswitches M27 and M28 allowing more current to flow through resistor R11 and thereby increasing the torque on the take-up reel motor.

The radius sensing means for the take-up reel is similarly constructed and consists of an arm 171a, a roller 172a, cams 173a and 174a, microswitches M27 and M28 and support bracket 181a.

The take-up motor is energized for film tensioning in the scan mode through relay contact K3-3, resistor R16, resistor R11, and reverse toggle switch S12. The supply reel motor circuit is identical to the takeup reel circuit except that current flows through relay contact K3-3, resistor R18, resistor R10 and reverse toggle switch S13. Resistor R16 is a tapped power resistor with its taps connected to the contacts of switch S1-2. With switch S1 in its 9.5 inch position (contact D) connection is made to the minimum resistance tap of resistor R16. At the 5 inch position (contact C) a higher resistance is provided, and at the 70 millimeter position (contact B) a still higher resistance, so that as the film size decreases the film tensioning decreases. Resistor R18 is identical to resistor R16. Resistors R17 and R19 are tapped power resistors with a higher resistance and are switched into the circuit during the slew mode to provide relatively less tension on the film than in the scan mode.

Static eliminator assembly

A 5000 volt power unit 292 produces an ionized field around a static bar 293 extending across the film path. As the film passes under the bar, the charge on its surface is neutralized by interaction with the bar field. Brushes 294 and 295 mounted between the static bar and the platen remove the discharged dust particles from the film surface.

Lamp cooling and controls

The lamp is cooled by a blower 297 connected to an inlet opening 298 in the lamphouse by a flexible hose 299. Another flexible hose 300 carries heat from a top opening 301. The blower remains on for a pre-selected time after the lamp is turned off to continue to cool the lamp.

The lamp is preheated at low voltage for a preselected time after the main power switch has been turned on. An illumination intensity knob 302 on the control panel is connected to a variable transformer 303 for varying the lamp brightness.

Light shielding

The optical path designated by arrow 9 is shielded from the lamphouse and other sources of light by chassis shield 307, lamp shield 308, 12× projection shield 309, 30× projection shield 310 and turret shield 311. In addition the entire frame is enclosed by panels as at 312. A hood 313 shields screen 11.

What is claimed is:

1. An apparatus for viewing film transparencies comprising:
    a rear view translucent image viewing screen; a light source;
    first means for positioning a film transparency in the optical path between said light source and screen;
    a plurality of projection lenses;
    second means selectively positioning said lenses at predetermined positions in the optical path between said film and screen;
    a condenser lens mounted adjacent said film plane and in the optical path between said light source and said film plane;
    a plurality of auxiliary condensing lenses;
    third means selectively positioning said auxiliary lenses at predetermined positions in said optical path between said condenser lenses and said light source; and
    fourth means mounting said light source for movement on said optical path to predetermined positions to and from said film plane; and manually operated means for selectively energizing said second, third and fourth means for producing a plurality of magnifications of said film transparencies on said screen with substantially uniform illumination over the image on said screen for each of said magnifications.

2. An apparatus as characterized in claim one including:
    fifth means mounting said projection lenses for movement on said optical path to and from said film plane for fine focusing said film transparency.

3. In a continuous-reel film viewing apparatus having a light source and a viewing screen and providing an optical path therebetween, a film drive transport comprising:
    a base;
    a subplate mounted for rotation on said base about an axis coaxial to said optical path and a motor drive therefor;
    a supply reel rotatably mounted on said subplate and a motor drive therefor;
    a take-up reel rotatably mounted on said subplate and a motor drive therefor, said reels being mounted for guiding said film in a plane across said optical path;
    a variable transfer being connected in an electric circuit for selectively energizing said take up and supply motor drives and having a first low voltage end point and continuously increasing to a second high voltage end point, and formed with a no voltage area between said first and second points;
    switching means for reversing said high and low end points of said variable transformer and selectively connecting said transformer to said supply and take-up reel motor drives;
    joystick means operatively connected to said variable transformer and said switching means and having a manually engageable member having a neutral position corresponding to said no voltage area and movable therefrom to a first position for gradually increasing the voltage to said take-up reel motor drive and movable from said neutral position to a second position for gradually increasing the voltage to said supply reel motor drive; and
    manually operable rotational control means connected to said subplate motor drive for rotating said subplate about said axis.

4. In a continuous reel film viewing apparatus having a light source and a viewing screen and providing an optical path therebetween, as characterized in claim 3:
   wherein said subplate has a first position; and
   manually selectively operable rotational centering control means electrically connected to said rotational control means and said subplate motor drive for automatically rotating said subplate to said first position.

5. In a continuous-reel film viewing apparatus having a light source and a viewing screen and providing an optical path therebetween, a film drive transport comprising:
   a base;
   a subplate mounted for rotation on said base about an axis coaxial to said optical path and a first motor drive therefor;
   a supply reel and a motor drive therefor;
   a take-up reel and a motor drive therefor, said reels being mounted for guiding the film in a plane across said optical path;
   said reels being mounted on said subplate for movement laterally of said axis and a second motor drive therefore;
   a variable transformer having a first low voltage end point and continuously increasing to a second high voltage end point, and formed with a no voltage area between said first and second points;
   switching means for reversing said high and low end points of said variable transformer and selectively connecting said transformer to said supply and take-up reel motor drives;
   joy stick means operatively connected to said variable transformer and said switching means and having a manually engageable member having a neutral position corresponding to said no voltage area and movable therefrom to a first position for gradually increasing the voltage to said take-up reel motor drive and movable from said neutral position to a second position for gradually increasing the voltage to said supply reel motor drive;
   manually operable rotational control means connected to said first motor drive for rotating said subplate about said axis; and
   manually operable lateral control means connected to said second motor for lateral movement of said reels.

6. In a continuous-reel film viewing apparatus having a light source and a viewing screen and providing an optical path therebetween as characterized in claim 5:
   wherein the center line of said reels are mounted for intersecting the center line of said optical path and reciprocally movable to either side of the center line of said optical path; and
   manually selectively operable lateral centering means connected in a circuit with said lateral control means and said second motor for automatically centering said reels so that their center line intersects the center line of said optical path.

7. In a continuous-reel film viewing apparatus having a light source and a viewing screen providing an optical path therebetween, a film drive transport comprising:
   a base;
   a subplate mounted for rotation on said base about an axis coaxial to said optical path and a first motor drive therefor;
   a supply reel and a motor drive therefor;
   a take-up reel and a motor drive therefor;
   platen means mounted intermediate said reels having a pair of transparent plates movable into and out of clamping engagement for securing the film in a plane across said optical path for fine focusing;
   said reels and platen means being mounted for movement laterally of said axis and a second motor drive therefor;
   a variable transformer having a first low voltage end point and continuously increasing to a second high voltage end point, and formed with a no voltage area between said first and second points;
   switching means for reversing said high and low end points of said variable transformer and selectively connecting said transformer to said supply and take-up reel motor drives;
   joy stick means operatively connected to said variable transformer and said switching means and having a manually engageable member having a neutral position corresponding to said transformer no voltage area and movable therefrom to a first position for gradually increasing the voltage to said take-up reel and movable from said neutral position to a second position for gradually increasing the voltage to said supply reel;
   manually operable rotational control means connected to said first motor drive for rotating said subplate about said axis;
   manually operable lateral control means connected to said second motor for lateral movement of said reels and platen; and
   manually operable platen control means for remotely actuating said platen means; and
   interlock means connected to said joystick means and to said platen control means permitting actuation of said platen means only when said joystick member is at said neutral position and said film is at rest.

8. In a continuous-reel film viewing apparatus having a light source, a film gate bisected by right angularly related X and Y axis and a viewing screen; a reel holding assembly comprising:
   a support;
   a guide rail-mounted on said support parallel to the Y axis of said film gate;
   a pair of upstanding supports mounted in spaced relation to one another for sliding movement on said rail;
   drive and driven spindles mounted on said respective upstanding supports with their free ends dimensioned and positioned for receiving the ends of a film reel; and
   drive means for conjointly moving said supports so as to position said spindle ends equidistant the X axis of said film gate so that reels of varying width may be mounted on said spindles with their centerlines coinciding with the X axis of said film gate.

References Cited

UNITED STATES PATENTS

| | | | |
|---|---|---|---|
| 1,928,002 | 9/1933 | Berg | 88—24 |
| 2,322,489 | 6/1943 | Von Madaler | 352—6 |
| 2,517,414 | 8/1950 | Pratt et al. | 88—28 |
| 2,518,209 | 8/1950 | Whipple et al. | 88—28 |
| 3,053,142 | 9/1962 | Wittel | 352—79 |
| 3,143,035 | 8/1964 | Morgan | 88—24 |
| 3,150,580 | 9/1964 | Ungnadner et al. | 352—142 |

FOREIGN PATENTS

| | | |
|---|---|---|
| 507,456 | 6/1939 | Great Britain. |
| 1,139,736 | 11/1962 | Germany. |
| 1,181,544 | 11/1964 | Germany. |

NORTON ANSHER, *Primary Examiner.*

W. M. FRYE, *Assistant Examiner.*